(12) United States Patent
Kew et al.

(10) Patent No.: US 9,405,653 B1
(45) Date of Patent: Aug. 2, 2016

(54) FILTERING DATA FRAMES USING PROGRAM INSTRUMENTATION

(71) Applicant: Pivotal Software, Inc., Palo Alto, CA (US)

(72) Inventors: John Victor Kew, Seattle, WA (US); Jonathan Travis, San Francisco, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 98 days.

(21) Appl. No.: 14/588,668

(22) Filed: Jan. 2, 2015

Related U.S. Application Data

(63) Continuation of application No. 13/828,801, filed on Mar. 14, 2013, now Pat. No. 8,954,935.

(51) Int. Cl.
*G06F 9/44* (2006.01)
*G06F 11/34* (2006.01)

(52) U.S. Cl.
CPC ..................................... *G06F 11/34* (2013.01)

(58) Field of Classification Search
CPC ............................. G06F 11/34; G06F 11/3466
USPC ......................................................... 717/130
See application file for complete search history.

(56) References Cited

U.S. PATENT DOCUMENTS

| | | | |
|---|---|---|---|
| 6,186,677 B1 | 2/2001 | Angel et al. | |
| 6,314,558 B1 * | 11/2001 | Angel ................. | G06F 11/3612 714/35 |
| 7,281,242 B2 | 10/2007 | Inamdar | |
| 7,367,025 B1 | 4/2008 | Nikolov et al. | |
| 7,788,730 B2 | 8/2010 | Dean et al. | |
| 7,810,075 B2 * | 10/2010 | Dostert ............... | G06F 11/3476 717/124 |
| 8,397,227 B2 | 3/2013 | Fan et al. | |
| 8,473,925 B2 | 6/2013 | Gagliardi et al. | |
| 8,578,339 B2 | 11/2013 | Day et al. | |
| 8,954,935 B2 | 2/2015 | Kew et al. | |
| 2004/0158819 A1 | 8/2004 | Cuomo et al. | |
| 2007/0226697 A1 | 9/2007 | Barsness et al. | |
| 2008/0016408 A1 * | 1/2008 | Abernathy .......... | G06F 11/3636 714/45 |

(Continued)

OTHER PUBLICATIONS

Binder et al., "Advanced Java Bytecode Instrumentation," PPPJ 2007, Sep. 5-7, 2007, Lisboa, Portugal, Copyright 2007 ACM.

(Continued)

*Primary Examiner* — Anna Deng
(74) *Attorney, Agent, or Firm* — Fish & Richardson P.C.

(57) ABSTRACT

The current application is directed to crosscutting functionalities, including byte-code instrumentation, error logging, and other such crosscutting functionalities. These crosscutting functionalities generally violate, or run counter to, modern code-development strategies and programming-language features that seek to partition logic into hierarchically organized compartments and modules with related functionalities, attribute values, and other common features. In particular, the current application is directed to byte-code instrumentation introduced into a computer program for collecting data, such as execution traces, elapsed times for routine execution, and other information at run time for logging and subsequently manual, semi-automatic, or automatic analysis. The current application is particularly directed to byte-code instrumentation that automatically filters collected data in order to log only data having greatest value for subsequent analysis.

20 Claims, 18 Drawing Sheets

(56) References Cited

U.S. PATENT DOCUMENTS

| | | | |
|---|---|---|---|
| 2010/0017789 A1* | 1/2010 | DeWitt, Jr. | G06F 11/3466 717/126 |
| 2012/0317551 A1* | 12/2012 | Hecht | G06F 11/3644 717/128 |
| 2013/0179868 A1 | 7/2013 | Greifeneder et al. | |
| 2014/0075422 A1 | 3/2014 | Rasmussen et al. | |
| 2014/0282430 A1 | 9/2014 | Kew et al. | |

OTHER PUBLICATIONS

Dimitriev, "Design of Jfluid: A Profiling Technology and Tool Based on Dynamic Bytecode Instrumentation," SMLI TR-2013-125, Nov. 17, 2003, Sun Microsystems, Inc., 19 pages.

* cited by examiner

| | 702 | 704 | 706 | 708 |
|---|---|---|---|---|
| SA→TE→TT2→TSUP→T1 | 12:13:12 | 9:51:02 | 0.51 |
| SA→TE→TT2→TSUP→T1 | 12:13:12 | 9:51:02 | 0.52 |
| SA→TE→TT2→TSUP→T2 | 12:13:12 | 9:51:02 | 0.43 |
| SA→TE→TT2→TSUP→T2 | 12:13:12 | 9:51:02 | 0.44 |
| SA→TE→TT2→TSUP→T1 | 12:13:12 | 9:51:02 | 0.61 |
| SA→TE→TT2→TSUP→T1 | 12:13:12 | 9:51:02 | 0.62 |
| SA→TE→TT2→TSUP→T1 | 12:13:12 | 9:51:02 | 0.44 |
| SA→TE→TT2→TSUP→T1 | 12:13:12 | 9:51:02 | 0.46 |
| SA→TE→TT2→TSUP→T1 | 12:13:12 | 9:51:02 | 0.01 |
| SA→TE→TT2→TSUP→T1 | 12:13:12 | 9:51:02 | 0.03 |
| SA→TE→TT2→TSUP→T1 | 12:13:12 | 9:51:02 | 0.41 |
| SA→TE→TT2→TSUP→T1 | 12:13:12 | 9:51:02 | 0.49 |
| SA→TE→TT2→TSUP→T2 | 12:13:12 | 9:51:02 | 0.48 |
| SA→TE→TT2→TSUP→T2 | 12:13:12 | 9:51:02 | 0.48 |
| SA→TE→TT2→TSUP1→F | 12:13:12 | 9:51:02 | 0.46 |
| SA→TE→TT2→TSUP→T2 | 12:13:12 | 9:51:02 | 3.61 |
| SA→TE→TT2→TSUP→T2 | 12:13:12 | 9:51:02 | 3.63 |
| SA→TE→TT2→TSUP→T1 | 12:13:12 | 9:51:02 | 0.51 |
| SA→TE→TT2→TSUP→T1 | 12:13:12 | 9:51:02 | 0.53 |
| SA→TE→TT2→TSUP→T2 | 12:13:12 | 9:51:02 | 0.48 |
| SA→TE→TT2→TSUP→T2 | 12:13:12 | 9:51:02 | 0.52 |
| SA→TE→TT2→TSUP→T1 | 12:13:12 | 9:51:02 | 0.47 |
| SA→TE→TT2→TSUP→T1 | 12:13:12 | 9:51:02 | 0.48 |
| SA→TE→TT2→TSUP→T1 | 12:13:12 | 9:51:02 | 0.35 |
| SA→TE→TT2→TSUP→T1 | 12:13:12 | 9:51:02 | 0.37 |
| SA→TE→TT2→TSUP→T2 | 12:13:12 | 9:51:02 | 0.61 |
| SA→TE→TT2→TSUP→T2 | 12:13:12 | 9:51:02 | 0.63 |
| SA→TE→TT2→TSUP→T2 | 12:13:12 | 9:51:02 | 0.55 |
| SA→TE→TT2→TSUP→T2 | 12:13:12 | 9:51:02 | 0.56 |
| SA→TE→TT2→TSUP→T1 | 12:13:12 | 9:51:02 | 0.55 |
| SA→TE→TT2→TSUP→T1 | 12:13:12 | 9:51:02 | 0.57 |
| SA→TE→TT2→TSUP→T2 | 12:13:12 | 9:51:02 | 0.52 |
| SA→TE→TT2→TSUP→T2 | 12:13:12 | 9:51:02 | 0.54 |
| SA→TE→TT2→TSUP→T1 | 12:13:12 | 9:51:02 | 0.45 |
| SA→TE→TT2→TSUP→T1 | 12:13:12 | 9:51:02 | 0.46 |
| SA→TE→TT2→TSUP→T1 | 12:13:12 | 9:51:02 | 0.45 |
| SA→TE→TT2→TSUP→T1 | 12:13:12 | 9:51:02 | 0.48 |
| SA→TE→TT2→TSUP→T2 | 12:13:12 | 9:51:02 | 0.47 |
| SA→TE→TT2→TSUP→T2 | 12:13:12 | 9:51:02 | 0.49 |
| SA→TE→TT2→TSUP→T1 | 12:13:12 | 9:51:02 | 0.49 |
| SA→TE→TT2→TSUP→T1 | 12:13:12 | 9:51:02 | 0.53 |
| SA→TE→TT2→TSUP→T1 | 12:13:12 | 9:51:02 | 0.51 |
| SA→TE→TT2→TSUP→T1 | 12:13:12 | 9:51:02 | 0.52 |
| SA→TE→TT2→TSUP→T1 | 12:13:12 | 9:51:02 | 0.43 |
| SA→TE→TT2→TSUP→T1 | 12:13:12 | 9:51:02 | 0.44 |
| SA→TE→TT2→TSUP→T2 | 12:13:12 | 9:51:02 | 0.52 |
| SA→TE→TT2→TSUP→T2 | 12:13:12 | 9:51:02 | 0.61 |
| SA→TE→TT2→TSUP1→G | 12:13:12 | 9:51:02 | 0.71 |
| SA→TE→TT2→TSUP→T1 | 12:13:12 | 9:51:02 | 0.41 |
| SA→TE→TT2→TSUP→T1 | 12:13:12 | 9:51:02 | 0.45 |
| SA→TE→TT2→TSUP→T2 | 12:13:12 | 9:51:02 | 0.46 |
| SA→TE→TT2→TSUP→T2 | 12:13:12 | 9:51:02 | 0.47 |
| SA→TE→TT2→TSUP→T1 | 12:13:12 | 9:51:02 | 0.42 |
| SA→TE→TT2→TSUP→T1 | 12:13:12 | 9:51:02 | 0.44 |
| SA→TE→TT2→TSUP→T2 | 12:13:12 | 9:51:02 | 0.41 |
| SA→TE→TT2→TSUP→T2 | 12:13:12 | 9:51:02 | 0.42 |
| ⋮ | ⋮ | ⋮ | ⋮ |

FIG. 7

```
SA→TE→TT2→TSUP→T1      12:13:12      9:51:02      0.51
SA→TE→TT2→TSUP→T1      12:13:12      9:51:02      0.61
SA→TE→TT2→TSUP→T1      12:13:12      9:51:02      0.44
SA→TE→TT2→TSUP→T1      12:13:12      9:51:02      0.01
SA→TE→TT2→TSUP→T1      12:13:12      9:51:02      0.35
SA→TE→TT2→TSUP→T2      12:13:12      9:51:02      0.44
SA→TE→TT2→TSUP→T2      12:13:12      9:51:02      3.61
SA→TE→TT2→TSUP→T2      12:13:12      9:51:02      0.61
SA→TE→TT2→TSUP→T2      12:13:12      9:51:02      0.55
SA→TE→TT2→TSUP→F       12:13:12      9:51:02      0.48
SA→TE→TT2→TSUP→G       12:13:12      9:51:02      0.71
```

FIG. 12

FILTERING DATA FRAMES USING PROGRAM INSTRUMENTATION

TECHNICAL FIELD

The current application is directed to design and implementation of control logic and computer programs and, in particular, to methods and systems for introducing byte-code instrumentation into one or more computer programs that automatically filters potential data prior to logging filtered data.

BACKGROUND

Instrumentation of computer code has been used, for many years, during development, analysis, optimization, and debugging of various types of computer programs, including operating-system code, virtual-machine code, various types of system routines and facilities, and application programs. By introducing instrumentation into computer code, various types of data can be collected from an executing system or program, including timing data, resource-utilization data, error-log data, and sequential or tree-like data representations of the code paths traversed by executing systems, programs, and routines.

Comprehensive instrumentation, unfortunately, does not well fit within many code-development paradigms. Many code-development strategies and programming-language features are directed to compartmentalizing functionality and logically organizing code into hierarchical modules, objects, and other constructs. In general, however, instrumentation and related tasks, including error logging and error handling, involve insertion of specialized functionality across objects, modules, and other such compartmentalized entities.

During the past decade, tools for facilitating code instrumentation and related tasks have been developed under the category of aspect-oriented programming ("AOP") tools and facilities. AOP provides tools for implementing crosscutting functionalities, such as instrumentation of code for analytics and logging errors, within the object-oriented-programming paradigm and other such development strategies. Crosscutting functionalities are functionalities that cut across the various code-development strategies and paradigms, such as object-oriented programming and earlier top-down programming that seek to logically organize code into functionality-related compartments and hierarchies. While AOP has addressed many of the problems associated with implementation of crosscutting tasks and facilities, certain challenges to implementing cross-cutting functionalities remain. For this reason, designers, developers, manufacturers and vendors, and, ultimately, users of a wide variety of different types of computer-instruction-encoded control components to modern computational systems, from processor-controlled appliances and cell phones to high-end distributed computational facilities, continue to seek additional tools and strategies for implementation of crosscutting functionalities, including code instrumentation.

SUMMARY

The current application is directed to crosscutting functionalities, including byte-code instrumentation, error logging, and other such crosscutting functionalities. These crosscutting functionalities generally violate, or run counter to, modern code-development strategies and programming-language features that seek to partition logic into hierarchically organized compartments and modules with related functionalities, attribute values, and other common features. In particular, the current application is directed to byte-code instrumentation introduced into a computer program for collecting data, such as execution traces, elapsed times for routine execution, and other information at run time for logging and subsequently manual, semi-automatic, or automatic analysis. The current application is particularly directed to byte-code instrumentation that automatically filters collected data in order to log only data having greatest value for subsequent analysis.

BRIEF DESCRIPTION OF THE DRAWINGS

FIG. 7 shows a portion of a hypothetical log file generated by byte-code instrumentation.

FIG. 12 illustrates a portion of a log file generated from byte-code instrumentation that employs filtering equivalent to the portion of the log file previously illustrated in FIG. 7.

DETAILED DESCRIPTION OF EMBODIMENTS

It should be noted, at the onset, that the current application is directed to implemented functionalities, and systems containing implemented functionality, that are real, tangible, physical subcomponents of physical devices and systems. One frequently encounters statements made by those unfamiliar with modern science and technology with regard to the "abstract" nature of "software," whatever the non-technically and non-scientifically educated individuals mean by these terms. Those familiar with science and technology well understand that much of the control logic incorporated within modern devices, machines, and systems is implemented as large sets of processor instructions that are physically stored in memories, mass-storage devices, and removable storage media and that must necessarily be so physically embodied in order to be accessed by processors and other computer machinery for execution. Physically embodied processor instructions are no less physical, tangible, and real than power supplies, processors, component housings, electronic memories, internal and external communications hardware, and other such components of modern devices, machines, and systems.

Figure 1:
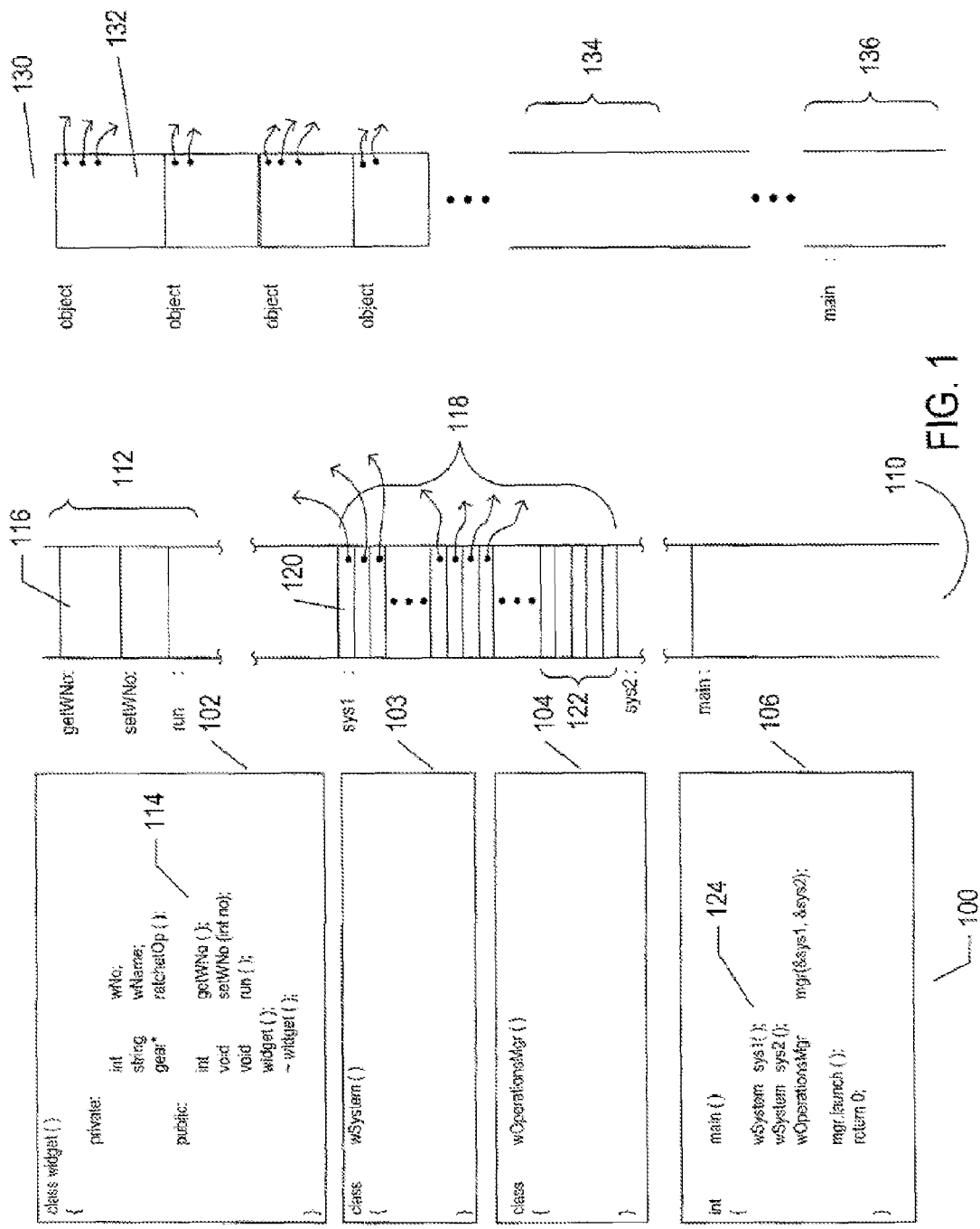
FIG. 1 illustrates a symbolically encoded computer program and a corresponding physical, in-memory implementation of the computer program.

FIG. 1 illustrates a symbolically encoded computer program and a corresponding physical, in-memory implementation of the computer program. A symbolically encoded computer program 100 may include a symbolic encoding of a number of different classes 102-104 and a main routine 106 that together specify a set of instructions that are stored in memory for execution by one or more processors within a processor-controlled device, machine, or system. In many modern programming environments, objects instantiated during execution of a computer program correspond to symbolically encoded classes. In FIG. 1, a virtual address space 110 composed, in general, of instruction-storage and data-storage faculties provided as physical address spaces both by one or more electronic memories and one or more non-volatile mass-storage devices, is shown as a column, according to conventional illustration techniques. The function members of classes are generally compiled into sets of sequentially organized processor instructions that reside in one portion of memory 112. For example, the function member "getWNo" 114 of the widget class 102 is compiled into a set of instructions represented by block 116 associated with a symbolic entry point or initial memory address. An object may be instantiated for a class by allocating and configuring a portion of the address space, such as address-space portion 118, to include references to entry points corresponding to member functions of the object as well as memory locations for object data members and/or references to object data members. For example, the instantiated object 118 is instantiated from the wSystem class 103 and contains references, such as reference 120, to entry points of function members of the object as well as storage locations 122 in memory for storing the values of object data members and references to data members located elsewhere in memory. This particular object, sys1, is instantiated in an initial line 124 of the main routine 106.

The in-memory implementation of the symbolically encoded program, shown in FIG. 1, is relatively simplistic. In actual devices, machines, and systems, the mappings from symbolic encodings of computer programs to a virtual address space that represents various different electronic memories and storage space within mass-storage devices may be complex. FIG. 1 also shows, in a right-hand column 130, a simplified representation of the in-memory implementation of the symbolically encoded computer program 100 as a set of in-memory resident object instantiations, such as object instantiation 132, a region of processor instructions corresponding to routines called from object instantiations 134, and processor instructions stored within memory that represent the main routine 136. The memory of a functioning processor-controlled device also includes large numbers of operating-system routines, library code, and many other types of control functionalities implemented as stored processor instructions that provide computational facilities and an execution environment for computer programs.

Figure 2:
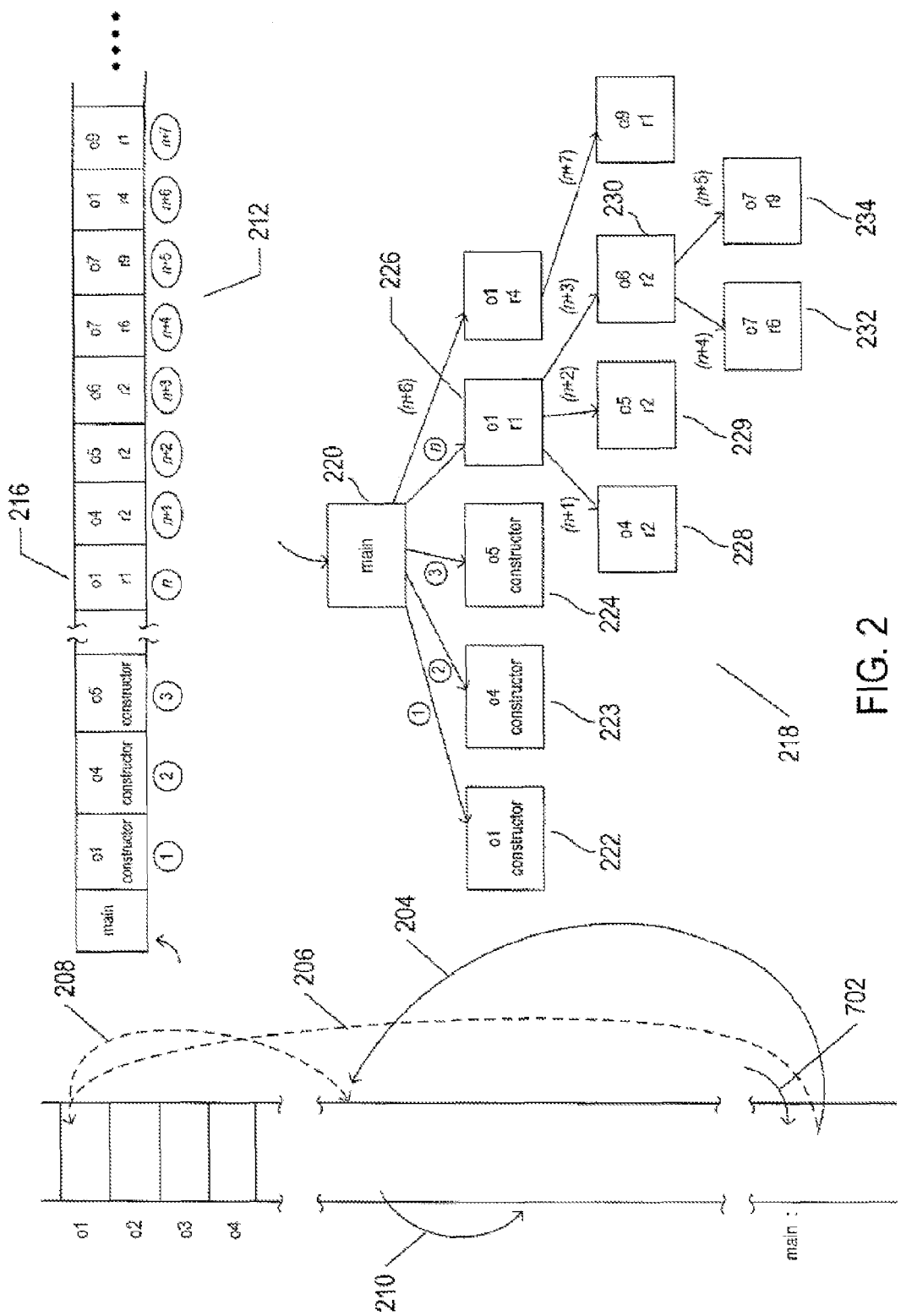
FIG. 2 illustrates program execution and collection of data via instrumentation.

FIG. 2 illustrates program execution and collection of data via instrumentation. When execution of a program is launched, the program generally begins execution at the first instruction of the main routine, as represented by arrow 202 in FIG. 2. As main instructions are sequentially executed, an instruction representing a call to a routine is generally encountered, with execution control passing to a portion of memory that contains instructions for the routine, as represented by arrow 204 in FIG. 2. When the routine is a member function of an instantiated object, the routine call involves accessing a virtual table for the object that contains function-member references, represented by dashed arrow 206 in FIG. 2, and following the reference to appropriate routine code, represented by dashed arrow 208 in FIG. 2. As the called routine begins to execute, the called routine often calls yet an additional routine, represented by arrow 210 in FIG. 2.

There are a variety of different types of instrumentation that may be included in an implementation of a symbolically encoded computer program. One type of instrumentation collects data at the beginning of execution and end of execution of each routine. The data collected from this type of instrumentation may form a sequence of data frames 212, each frame of the sequence representing one call to a routine. For example, in FIG. 2, a first frame 214 of the sequence corresponds to the initial call of the main routine and the next frame 216 of the sequence of data frames 212 corresponds to a call of a constructor member function associated with instantiated objected o1. Each data frame contains a variety of different types of information useful for subsequent analysis of program execution. A data frame may include time stamps, values of various machine-state variables, time-stamped indications of calls to system routines, and many other types of information that can be used, during analysis, to understand various aspects of program execution. For example, using a sequence of data frames produced by an executed program, an execution-analysis tool can determine the amount of time and/or number of processing cycles used by each routine in order to identify computationally expensive routines that might be good candidates for application of various optimization methods used to improve efficiency of execution of the program. Similarly, instrumentation may be included in the program to log errors that occur during execution of the program and to collect a myriad of different additional types of information may be used to understand and characterize the execution behavior of the computer program. Often, a sequence of data frames, such as the sequence of data frames 212 shown in FIG. 2, may be hierarchically organized for display 218. Levels of the hierarchy indicate the depth of nested routine calls during execution of the program. For example, the initially called main routine 220 may successively call constructors for a number of objects 222-224 and then call a routine "r1" of a first object 226 which calls various additional routines 228-230, one of which calls yet additional routines 232 and 234. Both the sequential organization of data frames and hierarchically organized data frames generated from data collected by instrumentation are familiar to computer scientists and engineers.

Initially, program developers would include explicit calls to instrumentation routines within program routines in order to instrument the program routines. For many reasons, this practice runs counter to modern computer-code-development strategies. Insertion of instrumentation is time consuming, expensive, and error prone, and altering behavior of instrumentation code may involve many different changes and general recompilation of program code. For example, it may be the case that, rather than saving a complete list of data frames generated by each routine called during execution of a program, which, for even a modestly sized program, may run into millions, tens of millions, or more data frames, an analyst may instead wish to either randomly generate a sparse set of data frames, to decrease the amount of data storage necessary but to still provide a sufficient amount of information about the execution of a program for analysis purposes, or may instead wish to aggregate the data frames during data collection. As one example, it may be the case that the analyst is not concerned with collecting individual information for lower-level routines within a trace hierarchy, but instead prefers to aggregate elapsed time, processing cycles, and other characteristics of the lower-level frames into higher-level frames. For example, referring to FIG. 2, instead of storing frames 226, 230, 232, and 234 generated as a result of the call by the main program to the routine "r1" of a first instantiated object, the analyst may prefer to aggregate all of the information contained in these four nodes in a single node 226 corresponding to the routine call. Modifying instrumentation included in each routine in order to accomplish such goals involves time-consuming, expensive, and potentially error-prone programming.

Figure 3:
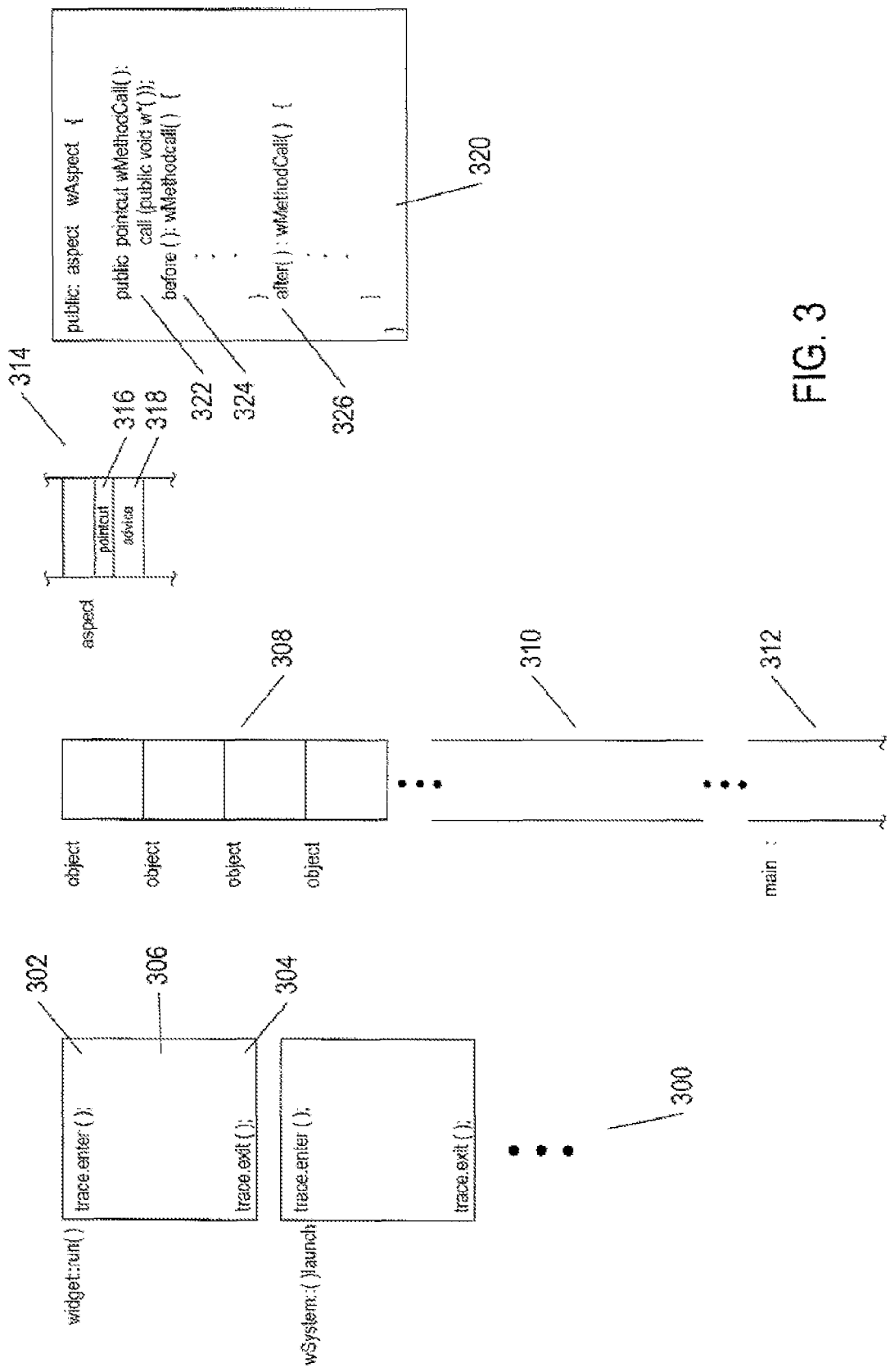
FIG. 3 illustrates the aspect-oriented-programming ("AOP") approach to implementing crosscutting functionality.

FIG. 3 illustrates the aspect-oriented-programming ("AOP") approach to implementing crosscutting functionality. In the left column of FIG. 3 300, the manual instrumentation of routines is illustrated. In this case, in order to generate a trace of data frames, as discussed above with reference to FIG. 2, a program developer has introduced routine calls to a trace object at the beginning 302 and end 304 of each routine, such as routine 306. As discussed above, this technique is expensive in time, error-prone, relatively inflexible, and contrary to modern program-development strategies, including object-oriented programming.

During the past decade, AOP techniques and facilities have been developed. In one AOP approach, in addition to object instantiations 308, routines 310, and a main program 312, an in-memory implementation of the program may additionally include one or more aspects 314, each aspect including a pointcut definition 316 and executable code 318 that is inserted at those points during program execution identified by the pointcut, referred to as "advice." FIG. 3 shows a symbolic encoding of a simple aspect 320, in which the pointcut definition 322 identifies various routines into which advice should be inserted and the "before" and "after" routines 324 and 326 specify advice code to be executed prior to and following execution of the routines identified by the pointcut during program execution. Of course, there are many different programming-language syntaxes and facilities that can be used to define aspects, the example shown in FIG. 3 is intended only to illustrate the fact that aspects can be symbolically encoded, rather than provide an example of how the encoding is carried out. Aspects thus provide an elegant tool for introducing crosscutting facilities into a computer program. Rather than introducing routine calls in each routine, as in the symbolic code 300 shown on the left side of FIG. 3, a programmer need only develop an appropriate aspect for the program, and the desired crosscutting functionality is automatically included during program execution. As discussed further, below, the aspect may be initially compiled to byte-code, and advice then inserted into executable code during final interpretation and/or compilation of bytecode by a virtual machine, in certain systems.

Figure 4:
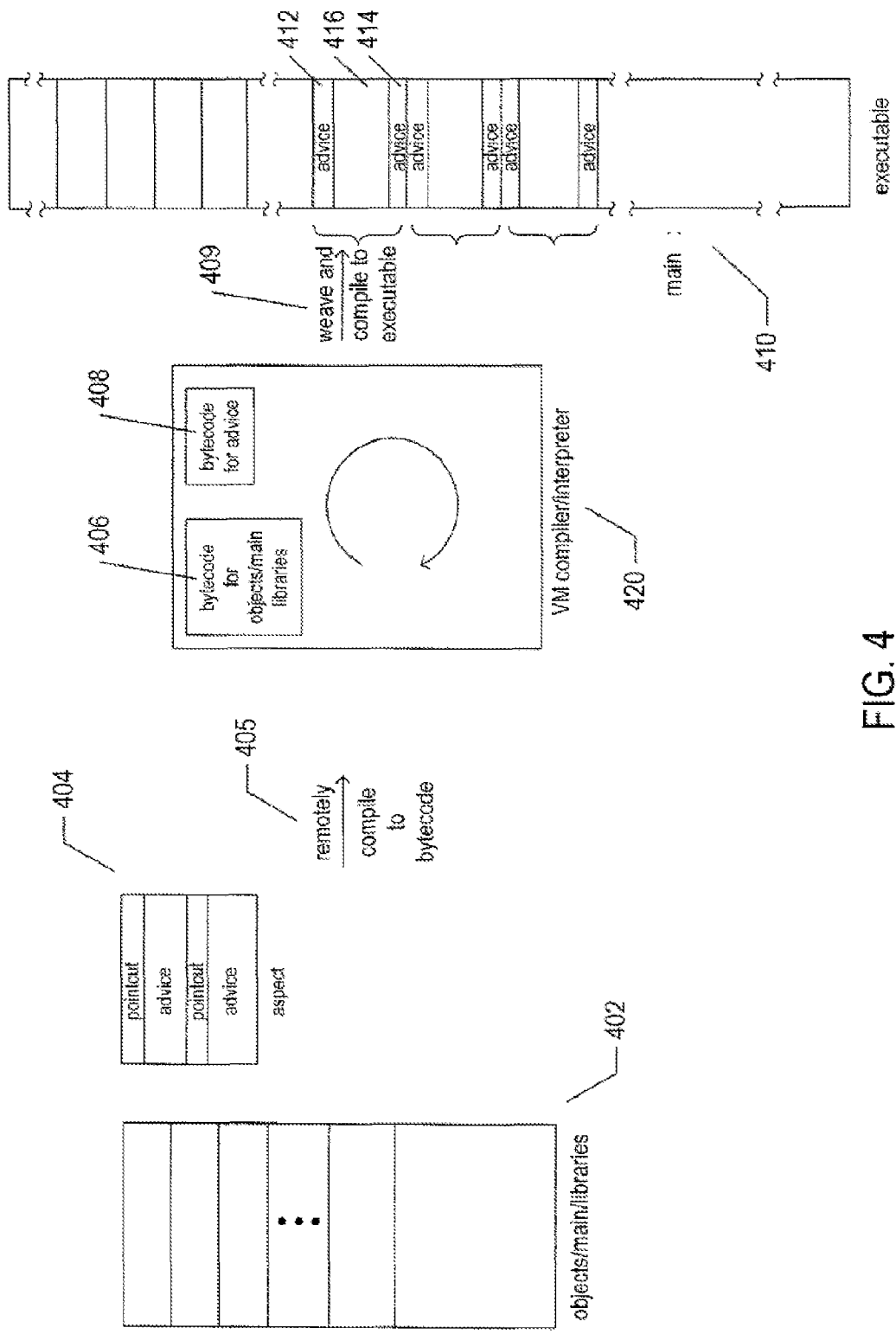
FIG. 4 illustrates one method by which AOP-defined instrumentation is included during program execution.

FIG. 4 illustrates one method by which AOP-defined instrumentation is included during program execution. In certain modern programming languages, such as Java, symbolically encoded program code is initially compiled to intermediate byte code, also referred to as "byte code" and "intermediate code," which is then interpreted and/or compiled by a virtual machine into executable code for execution on particular devices, machines, and systems. As shown in FIG. 4, a program, including class declarations and implementations and a main program, in addition to various libraries and system code 402 and an aspect 404, which includes one or more pointcuts and associated advice, are separately compiled 405 into byte code for the program 406 and byte code for the aspect advice 408. A virtual machine then generates, from these two sets of byte code, an executable 410 or portions of executable code stored in an address space. The process 409 by which the program byte code and aspect byte code is merged is referred to as "weaving." In the case of an aspect that includes pointcuts that identify points in time, during execution, corresponding to the entering of routines and exiting from routines, a virtual machine introduces the advice corresponding to the pointcuts into the code for those routines selected by the pointcuts, during executable-code generation. For example, as shown in FIG. 4, advice to be executed prior to and following execution of particular routines has been introduced by the virtual machine at the beginning 412 and at the end 414 of particular routines, such as routine 416. It may alternatively be possible to combine intermediate program code and aspect program code and then interpret or compile the combined program and aspect intermediate code.

Pointcuts can be used to identify any of various different subsets of points in the execution of a program, referred to as "joinpoints." Joinpoints may include any type of point during the execution of a program that may be defined, including the beginning of execution of routines, immediately following execution of routines, access to particular memory locations, and other such definable points that may arise during the execution of a routine. For example, considering the joinpoints corresponding to the beginning of execution of all routines, which can be defined as points at which routine-call instructions are executed, a pointcut may be used to define a subset of these joinpoints comprising the points in the execution of the program corresponding to routine-call instructions for only a subset of the routines of the program, such as the member functions of a particular class or instantiated object. Thus, aspect definition is quite general, and allows for introduction of functionality at arbitrarily selected defined points during the execution of a program. In the following examples, collection of data frames for trace analysis, as discussed above with reference to FIG. 2, is implemented using an aspect, such as aspect 320 discussed with reference to FIG. 3, which results in introduction of executable trace code immediately prior to and immediately following execution of each of a definable set of routines. However, techniques similar to those discussed below can be used for code inserted at other types of joinpoints.

It should be noted, at the onset of this discussion, that the current application is directed to automated filtering by byte-code instrumentation and not to the particular approach used to introduce byte-code instrumentation into computer programs. The AOP approach, described above, is an attractive approach for introduction of byte-code instrumentation, and is used as an example in the current application. However, byte-code data filtering may alternatively be implemented within byte-code instrumentation introduced manually, by various code-generation techniques, or by other methods and approaches.

Figure 5A:
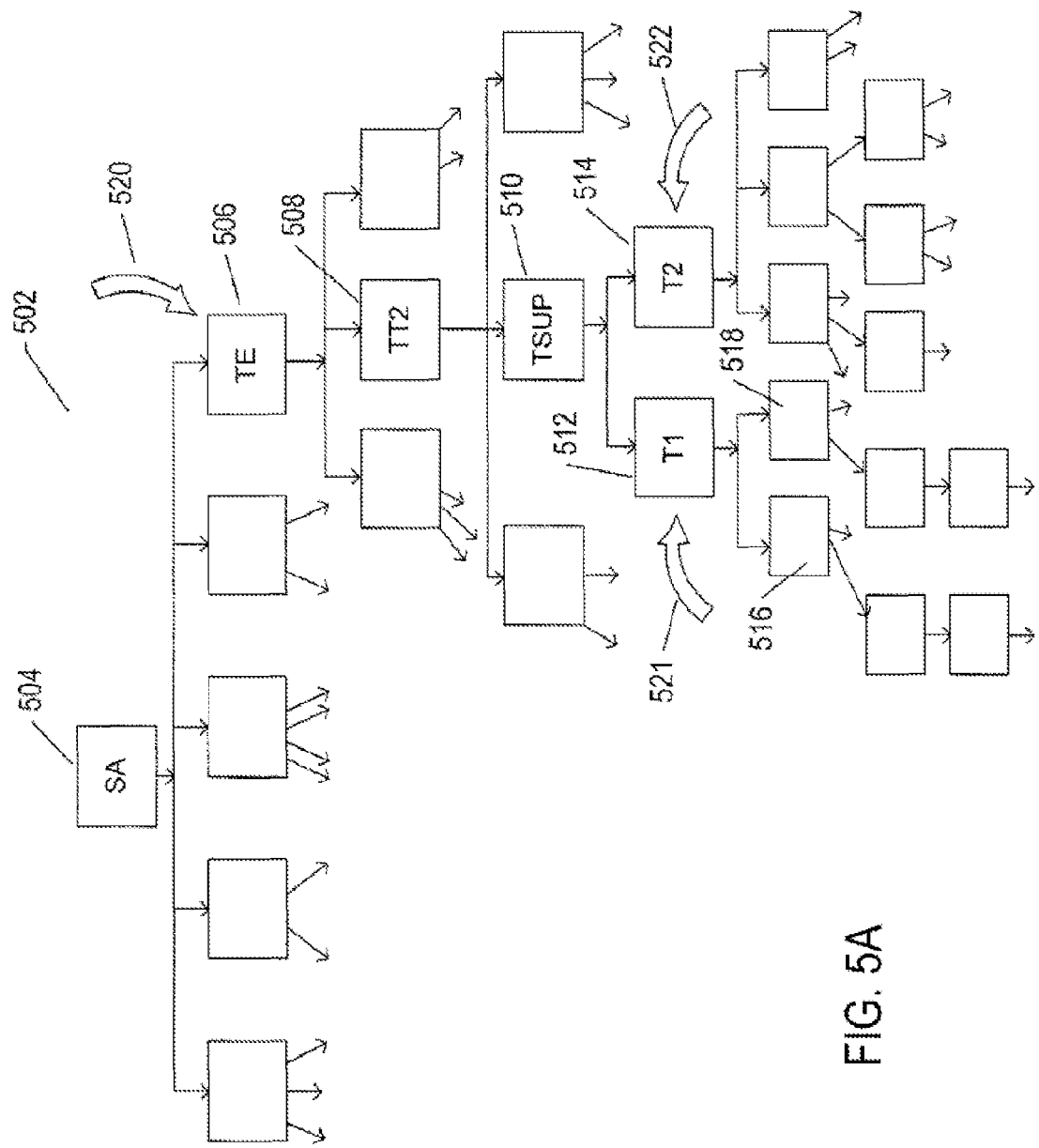
FIGS. 5A-B illustrate potential data frames of an example server application and execution traces generated during execution of the server application.
Figure 5B:
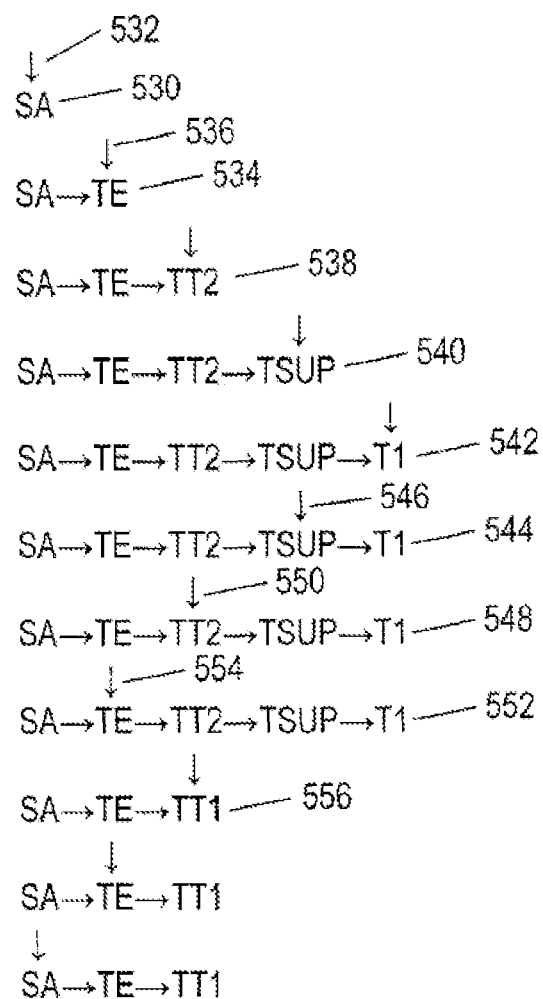

FIGS. 5A-B illustrate potential data frames of an example server application and execution traces generated during execution of the server application. FIG. 5A illustrates a tree of potential data frames for a server application "SA." The example tree of potential data frames 502 is a portion of a much larger tree of potential data frames that includes a representation of all potential data frames for a particular server application. There is at least one node in the tree for each routine that may be called during execution of the server application, with the nodes organized hierarchically, with each root-to-leaf-node traversal representing a possible sequence of nested calls that might be observed in a routine-call stack during server-application execution. Whether or not a potential data frame is actually generated and stored during a particular server-application execution depends on whether the corresponding routine is instrumented to generate a data frame and whether an execution path traverses a node corresponding to the routine.

The root node 504 in FIG. 5 corresponds to the highest code level of the server application. The server-application main routine may call various lower-level routines, such as the transaction-engine routine "TE" corresponding to node 506. This routine may, in turn, call various lower-level routines, including a transaction-type-2 routine "TT2" 508. The routine "TT2" 508 may, in turn, call various lower-level routines, including a transaction setup routine "TSUP" 510 which, in turn, calls either a first transaction routine "T1" 512 or a second transaction routine "T2" 514. These two transaction routines may call a variety of different system routines and lower-level routines, such as lower-level routines 516 and 518 called by the routine "T1" 512.

In many cases, including execution monitoring and performance monitoring, byte-code instrumentation may be inserted to provide comprehensive data collection within particular routines at particular levels of the potential data-frame tree 502. These routines may be logical execution endpoints with respect to one or more logical tasks carried out by the computer program. For example, in FIG. 5, as indicated by large arrows 520-522, the routines "TE" 506, "T1" 512, and "T2" 514 may be identified as logical endpoints. The routine "TE" may be called for each transaction carried out by the server application, and one of the two routines "T1" and "T2" may be called during processing of each type-2 transaction. The routine "TE" may also call other routines at the level of routine "TT2" to carry out other types of transaction. Although byte-code instrumentation may be included within other of the routines that are called during the execution of the server application, the logical endpoints may represent routines in which particular comprehensive data collection may be implemented by byte-code instrumentation or that, when included in a trace, or traversal of the potential data-frame tree during program execution, may identify the trace as having particular significance. In the example of the server application to which the potential data-frame tree shown in FIG. 5A is associated, the "TT2," "T1," and "T2" may represent the logically significant points for a particular instrumentation-implemented data collection and subsequent analysis and are therefore considered as logical endpoints in the current example.

FIG. 5B illustrates the concept of an execution trace. A trace is a sequential list of the routines called during execution of a program. Various different types of traces may be generated, including branching traces. In one type of trace, used to describe the methods and systems to which the current application is directed, a trace includes a sequential list of called routines corresponding to the longest active unbranched execution path through a hierarchical representation of the program, such as a potential data-frame tree shown in FIG. 5A. The trace may additionally include an indication of the routine within the trace executing at the time that the trace is recorded. For example, consider an execution path that starts with a call to the server-application program. When the server-application program is first called, the trace 530 include a single element, "SA," along with an indication 532 that the routine executing when the trace is recorded is the routine "SA." Later, as the routine "SA" executes, the routine "SA" calls the routine "TE." When execution enters execution of the routine "TE," a trace 234 recorded at that point has two elements with an indication 536 that the currently executing routine is the routine "TB," FIG. 5B shows the traces after the routine "TE" calls the routine "TT2" 538, after the routine "TT2" calls the routine "TSUP" 540, and after the routine "TSUP" calls the routine "T1" 542. A trace recorded when the routine "T1" returns and execution resumes within the calling routine "TSUP," the trace 544 still includes the full execution path but now indicates 546 that the currently executing routine is the routine "TSUP." When the routine "TSUP" finishes and execution of the routine "TT2" resumes, a trace 548 recorded at that point includes an indication 550 that the routine "TT2" is currently executing after having called the routine "TSUP," which, in turn, called routine "T1." Once the routine "TT2" finishes and execution returns to the routine "TE," a trace 552 recorded during execution of the routine "TE," following completion of the called routine "TT2," includes an indication 554 that the routine "TE" is currently executing. Were the routine "TE" now to call a different routine "TT1," the trace recorded within called routine "TT1" 556 shows the routine "TT1" as the new lowest-level element. Thus, in this implementation, the trace is the longest unbranched execution path to which the currently executing routine belongs. When the routines "TE," "T1," and "T2" are considered as logical endpoints, as discussed above, it can be seen that a trace, such as trace 542, may contain multiple logical endpoints.

Figure 6A:
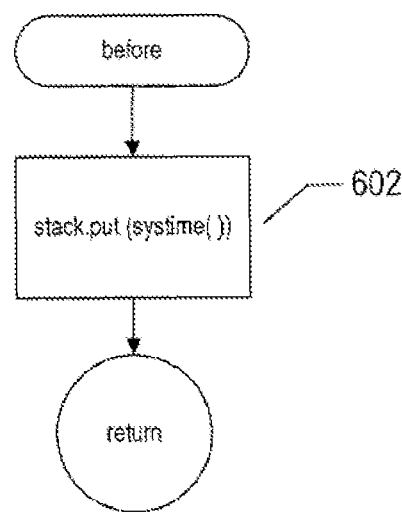
FIGS. 6A-B illustrate an example pair of "before" and "after" advice routines that may be inserted as byte-code instrumentation into particular routines identified by pointcuts via the AOP approach discussed above with reference to FIG. 3.
Figure 6B:
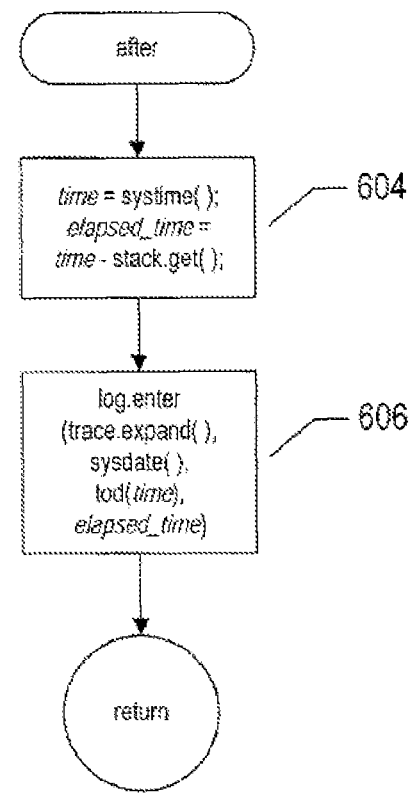

FIGS. 6A-B illustrate an example pair of "before" and "after" advice routines that may be inserted as byte-code instrumentation into byte code to bracket particular routines identified by pointcuts via the AOP approach, discussed above with reference to FIG. 3, in order to collect elapsed-time-of-execution data for performance monitoring. The "before" routine executes prior to execution of an instrumented routine and the "after" routine executes following completion of execution of the instrumented routine.

FIG. 6A shows the "before" advice code. This advice code, in step 602, is called prior to execution of a routine and stacks an indication of the current system time, obtained by calling a system routine, onto a stack that can be accessed by the "after" routine which executes following execution of a program routine bracketed by the "before" and "after" advice routines. FIG. 6B shows the "after" routine corresponding to the "before" routine illustrated in FIG. 6A. In step 604, the routine "after" sets a variable "time" to the current system time via a system call. In step 604, the routine "after" also sets a variable "elapsed_time" to the difference between the current time and the time that was placed on a stack in step 602 of FIG. 6A. Then, in step 606, the routine "after" calls an enter member function of a logging object log in order to log, as a data frame, the computed elapsed time, an indication of the time of day, an indication of the current date, and a representation of the trace that includes the call to the routine bracketed by the "before" and "after" advice routines.

By using the AOP approach, discussed above with reference to FIG. 3, to introduce the "before" and "after" advice routines, discussed above with reference to FIGS. 6A-B, to instrument the routines "TE," "T1" and "T2," the woven server application program may generate a log file that includes date, time, and elapsed-time information for routines "TE," "T1," and "T2." FIG. 7 shows a portion of a hypothetical log file generated by data supplied by the byte-code instrumentation. Each entry of the log file, or data frame, is contained within a separate row. Each entry includes a representation of a trace 702, a date 704, a time of day 706, and an indication of the elapsed time for routine execution in milliseconds 708.

Even from the small portion of the log file shown in FIG. 7, it is apparent that, were the byte-code instrumented server application to be run for even a few minutes, an enormous number of log entries would be produced. Furthermore, many of the log entries would be entirely redundant. Because the routine "TE" is always called prior to a call of the lower-level routines "T1" and "T2," each log entry for the routines "T1" and "T2" is necessarily followed by a log entry for the routine "TE" when the log entries are sorted by time of entry. In such cases, the additional data associated with the entry for the routine "TE" may be essentially redundant and uninteresting for subsequent analysis, as the bulk of the transaction processing for type-2 transactions is actually carried out by either of the routines "T1" or "T2." Thus, by introducing byte-code instrumentation, desired performance-monitoring data may be collected, but the data may be highly redundant, in certain cases, and may be of such an enormous volume that the instrumented server application program may seriously challenge the data-storage capacities of a server computer and execution of the advice routines may seriously perturb and alter execution behavior of the server application. The current application is directed to automated filtering of data produced by byte-code instrumentation in order to address these problems.

Figure 8A:
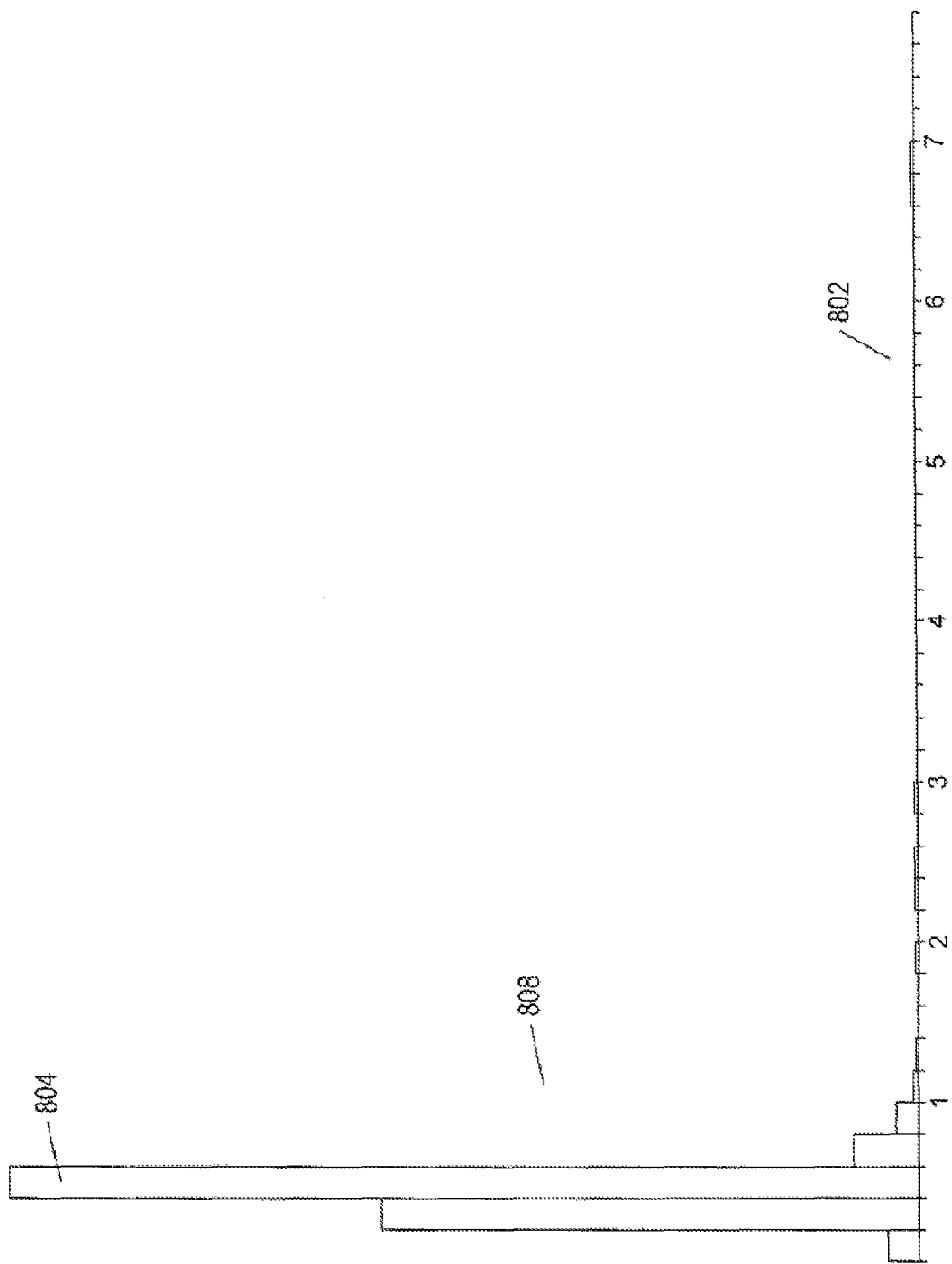
FIGS. 8A-B show two different hypothetical histograms generated from the elapsed-time data contained in a log file, such as the log file illustrated above in FIG. 7.
Figure 8B:
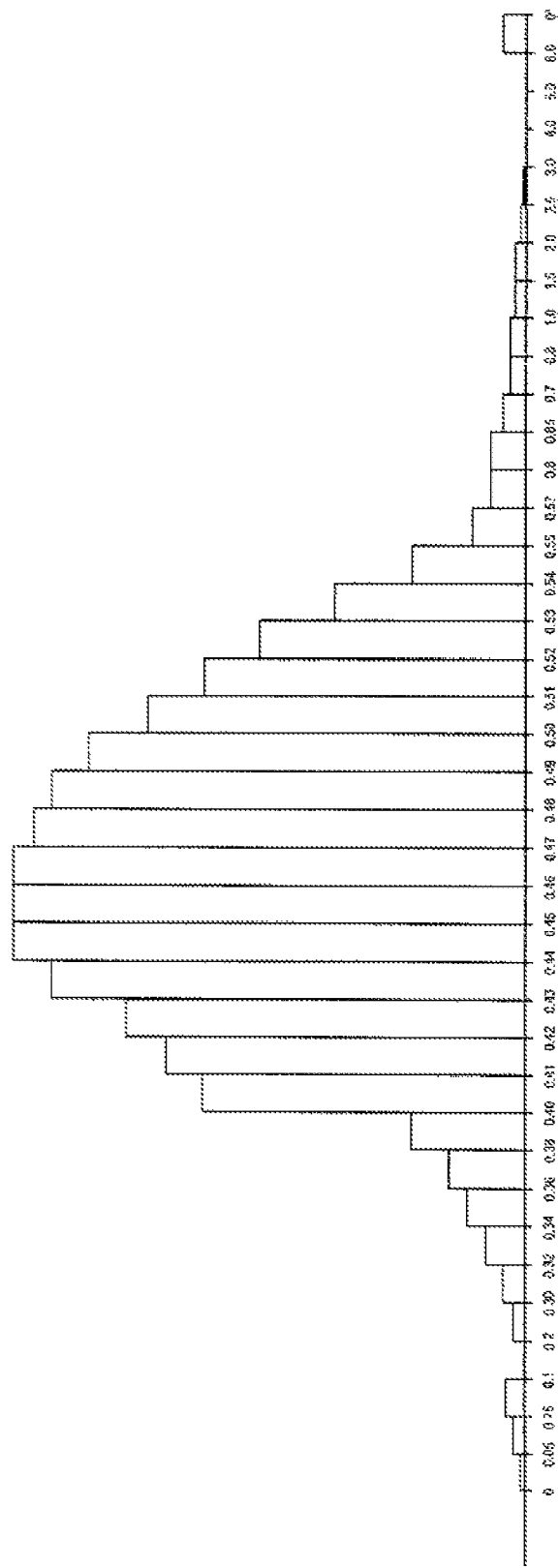

FIGS. 8A-B show two different hypothetical histograms generated from the elapsed-time data contained in a log file, such as the log file illustrated above in FIG. 7. Considering FIG. 7, the majority of elapsed-time data falls between 0.30 and 0.60 milliseconds, but there are several outliers, including an elapsed time of 0.01 and an elapsed time of 3.61. FIG. 8A shows a histogram prepared from this type of data in which the horizontal axis 802 corresponds to the elapsed time and the heights of the histogram bars, such as histogram bar 804, represents the number of log entries with elapsed times falling within a portion of the horizontal axis corresponding to the base of the histogram column. When the horizontal axis is regularly incremented in milliseconds in order to capture all possible elapsed-time values, and when the outlying elapsed-time values may range from 0.05 to 7.0, then the bulk of the plotted histogram data 808 is relatively narrow and tall and is crowded at the very lowest portion of the horizontal axis. When it is desired to provide more detailed information with regard to the elapsed-time values in a histogram format, then, as shown in FIG. 8B, a non-linear division of the horizontal axis can be employed to spread the histogram data out horizontally. In other words, it may be useful to collect elapsed-time data in bins of varying elapsed-time-interval sizes in order to obtain a better understanding of the elapsed-time characteristics of the program execution.

In one implementation of byte-code-instrumentation filtering, to which the current application is directed, a combination of techniques is used in order to filter data collected during execution of instrumentation, or advice, routines prior to reporting or logging of the data. The filtering can decrease or remove redundant data logging and can vastly decrease the total number of data frames that are logged.

Figure 9:
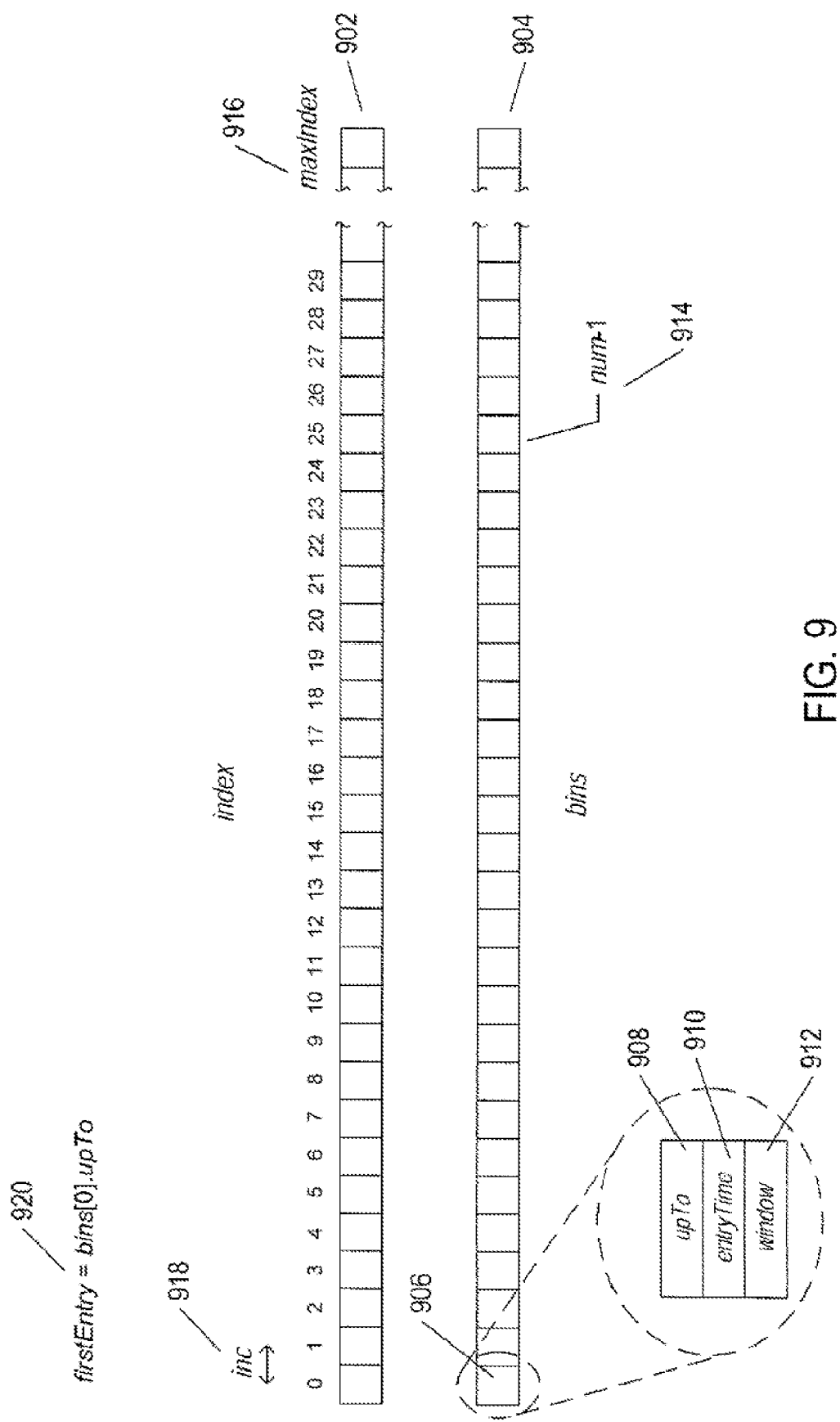
FIG. 9 illustrates data structures used in a described implementation of byte-code-instrumentation filtering.

FIG. 9 illustrates data structures used in a described implementation of byte-code-instrumentation filtering. A first array index 902 serves as an index into a second array bins 904 containing bin elements corresponding to the intervals of the bins in the histogram illustrated in FIG. 8B. The elapsed-time data potentially collected by the byte-code instrumentation is binned and filtered via the second array bins 904. Entries in the array bins can be relatively quickly identified using the array index. Each entry in the array bins, such as entry 906, includes three fields: (1) upTo 908, which indicates the maximum-elapsed time value associated with the bin; (2) entry-Time 910, which indicates the last time of logging of a trace with an elapsed-time value corresponding to the bin entry; and (3) window 912, which indicates the length of a time window during which at most one trace with an elapsed-time value corresponding to the bin entry is to be logged. The number of bin entries defined for a particular data collection is stored in a variable num, with the highest used bin having an index of num−1 (914 in FIG. 9). Similarly, the index array 902 has a number of entries maxIndex+1 (916 in FIG. 9). The index entry is associated with a value inc 918 that represents an increment in elapsed time between each entry in the index. Finally, the variable "firstEntry" 918 includes the maximum elapsed-time value associated with the first entry in the array bins.

Figure 10A:
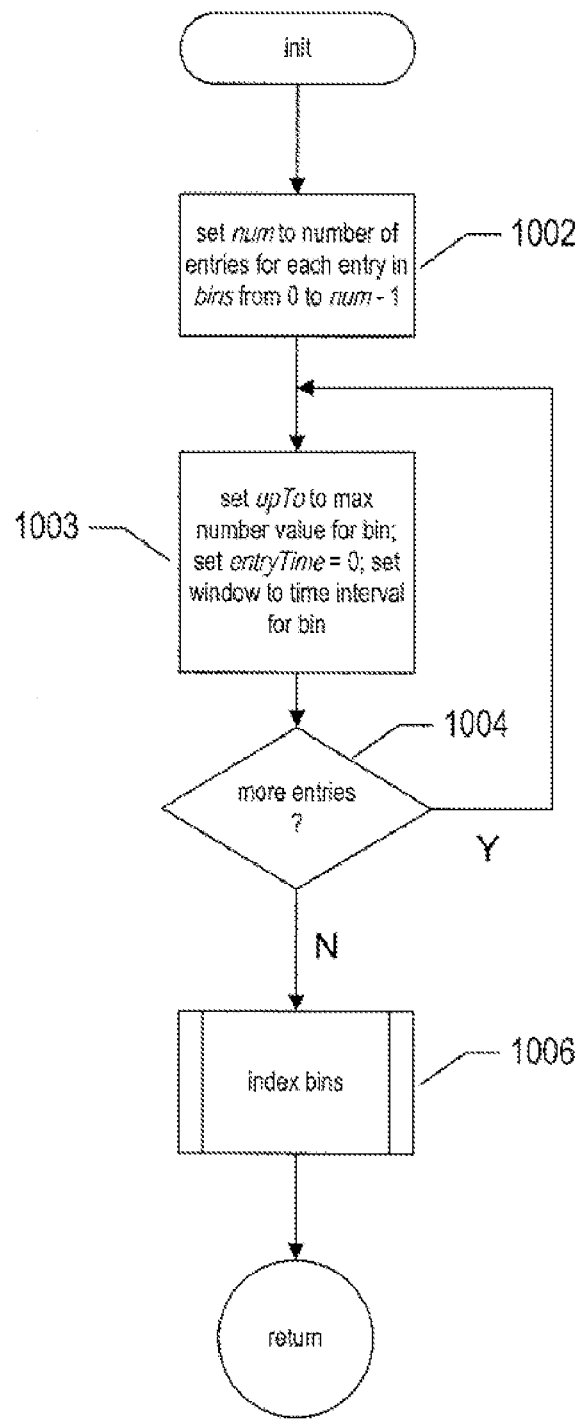
FIGS. 10A-B illustrate initialization of the data structures shown in FIG. 9.
Figure 10B:
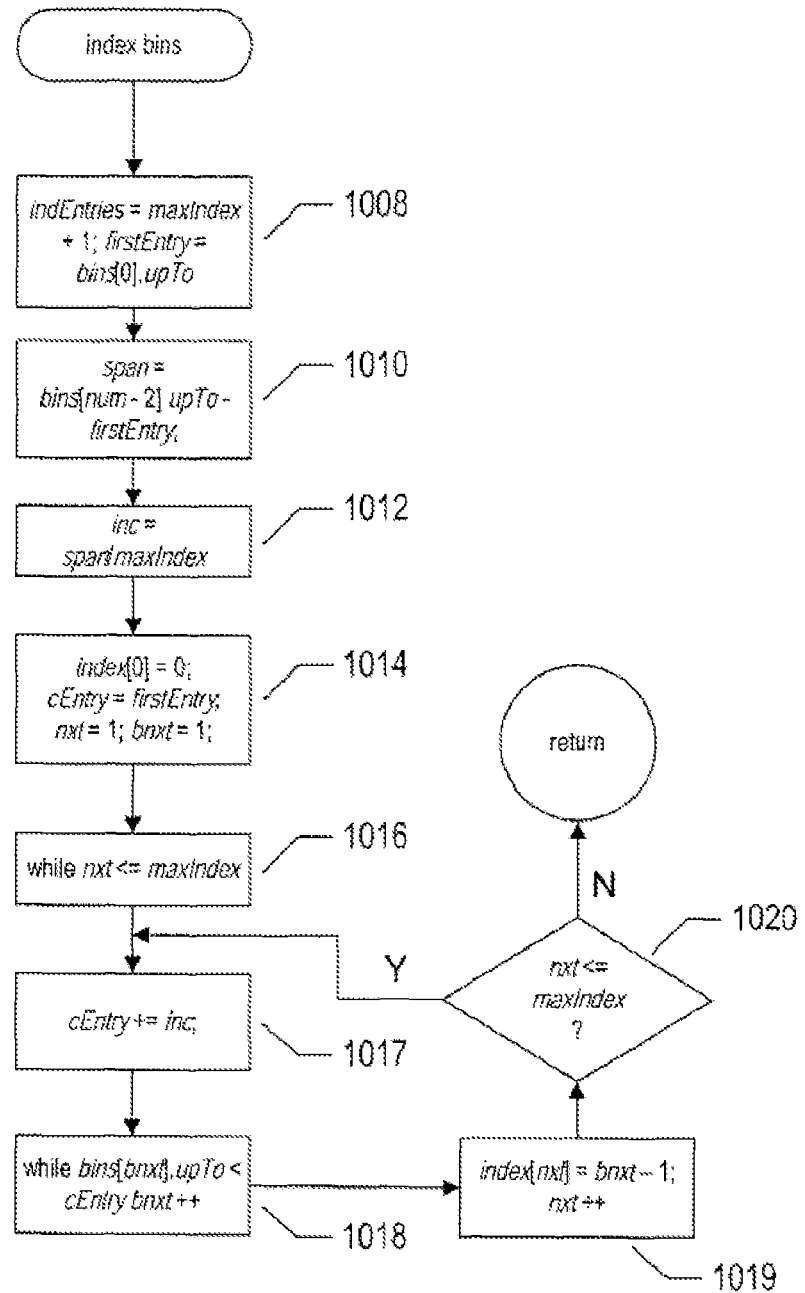

FIGS. 10A-B illustrate initialization of the data structures shown in FIG. 9. In the for-loops of steps 1002-1004, the entries in the array bins are initialized to values determined by a human analysis or input to the routine in digitally encoded format. The values stored in entries of the array bins, as discussed above, specify the maximum elapsed-time value associated with a particular bin, the last entry time for a trace with an elapsed time associated with the bin, and an indication of a time interval during which only at most a single trace with an elapsed time associated with the bin should be logged. Then, in step 1006, the routine "index bins" is called to generate values stored in the index array.

FIG. 10B illustrates, using a control-flow diagram, the routine "index bins" called in step 1006 of FIG. 10A. In step 1008, a variable "endEntries" is set to the number of entries in the array index and the variable "firstEntry" is set to the elapsed-time value stored in the "upTo" field of the first entry in the array bins. In step 1010, the variable "span" is computed as the difference between the maximum elapsed-time value for the second to the last bin in the array bins and the maximum elapsed time of the first bin in the array bins. In step 1012, the variable "inc" is computed by dividing the value stored in the array "span" by one less than the number of entries in the index array. In step 1014, the first entry in the index array is set to have the value stored in the variable "firstEntry," the variable "cEntry" is set to the value of the variable "firstEntry," the variable "nxt" is set to 1, and the variable "bnxt" is set to 1. Then, in each iteration of the while-loop of steps 1016-1019, a next entry of the index array is set to a computed value representing the index of an entry in the array bins, with the while-loop executing until all entries of the index array have been set. In step 1017, the variable "cEntry" is incremented by the contents of the variable "inc." In the inner while-loop of step 1018, the contents of the variable "bnxt" is incremented until the contents of the variable "bnxt" indexes a bin with an upTo-field-value greater than or equal to the current contents of the variable "cEntry." In step 1019, the next entry in the array index is set to one less than the current value stored in the variable "bnxt" and the variable "nxt" is incremented.

In addition to the data structures discussed with reference to FIG. 9 and initialized by the initialization routine discussed above with reference to FIGS. 10A-B, the currently described method and system employs an ordering of logical endpoints, discussed above with reference to FIG. 5. In one implementation, logical endpoints are ordered, in precedence, by the level of the corresponding data-frame nodes in a potential data-frame tree, with lowest-level nodes given higher preference than higher-level nodes. Other types of ordering may be used, including arbitrary orderings specified by an analyst.

These orderings are used by the currently described methods and systems to ensure that two or more log entries do not overlap. Recall that, as discussed above with reference to FIG. 7, in the example of the server-application program, a log entry for routines "T1" or "T2" is necessarily followed by a log entry for the routine "TE." The following entry subsumes the previous entry, or, in other words, the elapsed time of the following entry includes the elapsed time of the previous entry in these cases. As discussed above, this represents redundant data in many types of analyses. In other words, for all types of transactions other than the second type of transaction, an analyst may need a log entry for the routine "TE" 506, but when the transaction type is 2, the analyst may need a log entry for one of the routines "T1" or "T2." In other words, a log entry for the routine "TE" is only valuable for transaction types other than transaction-type 2. Logical-endpoint ordering provides the basis for a method to filter the data collected by the byte-code instrumentation so that only one entry of a pair of potential entries with traces including logical endpoints "TE" and one of "T1" and "T2" are logged.

Figure 11:
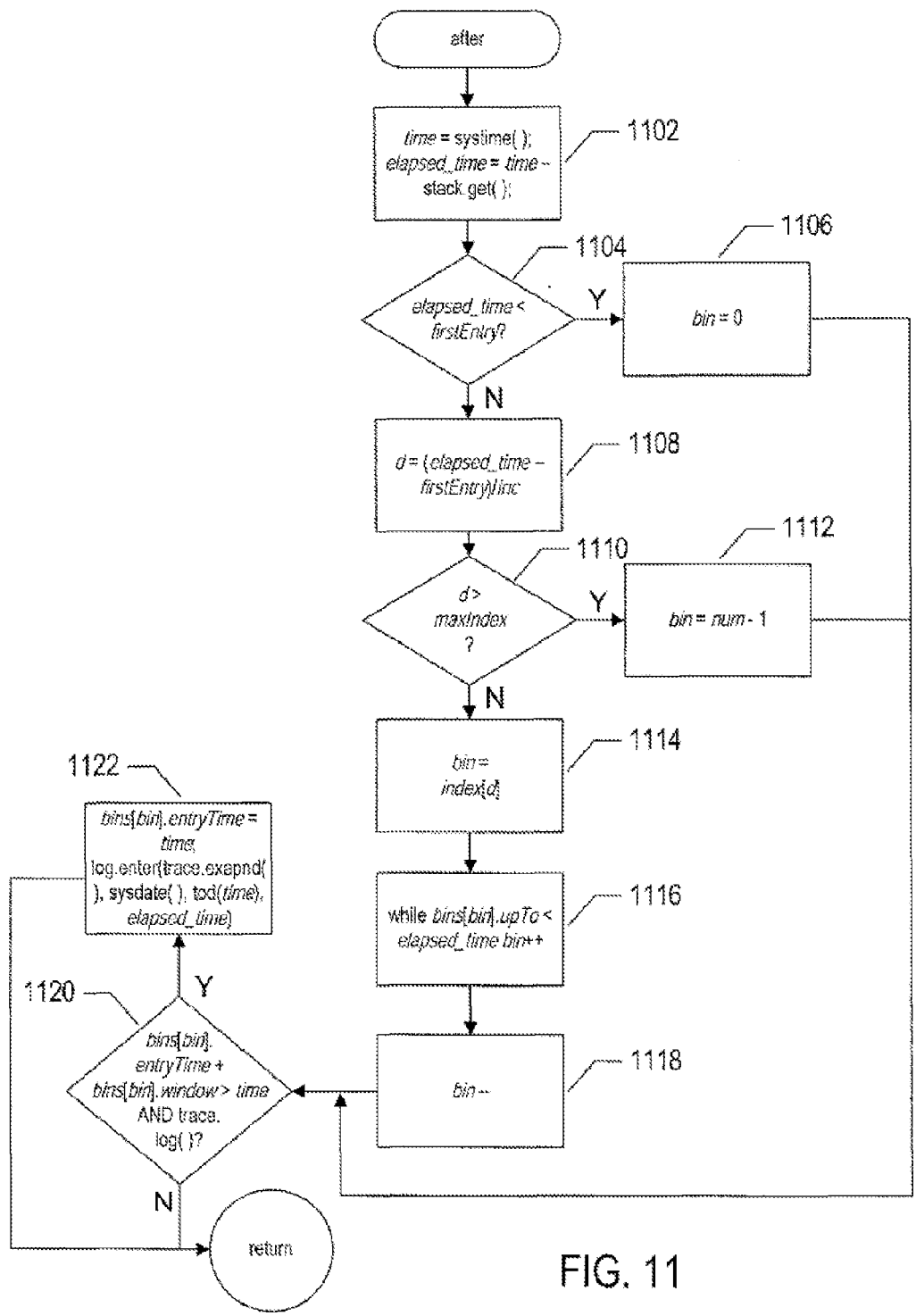
FIG. 11 provides a control-flow diagram for the advice routine "after" that incorporates byte-code-instrumentation filtering.

FIG. 11 provides a control-flow diagram for the advice routine "after" that incorporates byte-code-instrumentation filtering. The routine "before" is not changed in order to implement byte-code filtering. In step 1102, the variable time is set to the current system time via a system call and the variable elapsed time is set to the difference between the current time and the time stacked by the previous call to the advice routine "before." Then, in step 1104, the routine "after" determines whether the elapsed time computed in step 1102 is less than the value stored in the variable firstEntry. When the elapsed time is less than the value stored in the variable firstEntry, the variable bin is set to 0 in step 1106. Otherwise, the variable d is set to the difference between the calculated elapsed time and the value stored in the variable firstEntry divided by the value stored in the variable inc, which computes an index into the array index for an element of the array index containing the index of an entry in the array bins from which to begin searching for an entry into the array bins corresponding to the value stored in the variable elapsed_time, in step 1108. When d is greater than the maximum index of the index array, as determined in step 1110, the variable bin is set to index the last entry in the array bins, in step 1112. Otherwise, the variable bin is set to the index entry stored in the array index at position d, in step 1114 and the array bins is searched, in steps 1116 and 1118, for the appropriate bin corresponding to the computed elapsed time. In step 1120, the routine "after" determines whether a trace associated with an elapsed time corresponding to the bins array entry indexed by the variable bin has been logged during a preceding interval of time equal to the time interval stored in the field window. When no such trace has been logged within the preceding time window and when a call to a function trace.log( ) which returns the Boolean value TRUE, the entry-Time field of the element of the array bins, indexed by the variable bin, is set to the current time and the trace is logged, in step 1122. The function trace.log( ) determines whether there are two or more logical endpoints in a trace and the routine that most recently finished execution is one of the multiple logical endpoints, and, in the case that there are two or more logical endpoints in the trace and the routine that most recently finished execution is one of the multiple logical endpoints, returns TRUE only when the routine that most recently finished execution has the highest logical-endpoint precedence of the multiple logical endpoints. For example, when, during execution of the above-discussed instrumented server application, the call to trace.log( ) is made in the "after" advice routine immediately following execution of the routine "TE," which called routine "T1," the routine trace.log( ) returns FALSE, since the trace also includes logical endpoint "T1," which has higher precedence. However, when, during execution of the above-discussed instrumented server application, the call to trace.log( ) is made in the "after" advice routine immediately following execution of the routine "T1," the routine trace.log( ) returns TRUE because, although the trace also includes logical endpoint "TE," logical endpoint "T1" has higher precedence.

FIG. 12 illustrates a portion of a log file generated from the server application with byte-code instrumentation that employs filtering. The data in the portion of the log file shown in FIG. 12 is collected from an interval of execution of the server application equivalent to the interval of execution of the non-instrumented server application that generated data contained in the portion of the log file illustrated in FIG. 7. Note that the many entries illustrated in FIG. 7 have been collapsed to only a relatively small number of entries in FIG. 12. In general, during each time window associated with an elapsed-time range, only at most a single, representative log entry is generated for the elapsed-time range by the byte-code instrumentation that employs filtering. In alternative implementations, the choice of whether or not to log data frames may also depend on the severity of an error code generated during execution of the routine bracketed by "before" and "after" advice code. In such implementations, each execution of a routine that generates an error code with a severity greater than a threshold severity may be logged, without regard for the number of log entries generated within the most recent time window.

Figure 13:
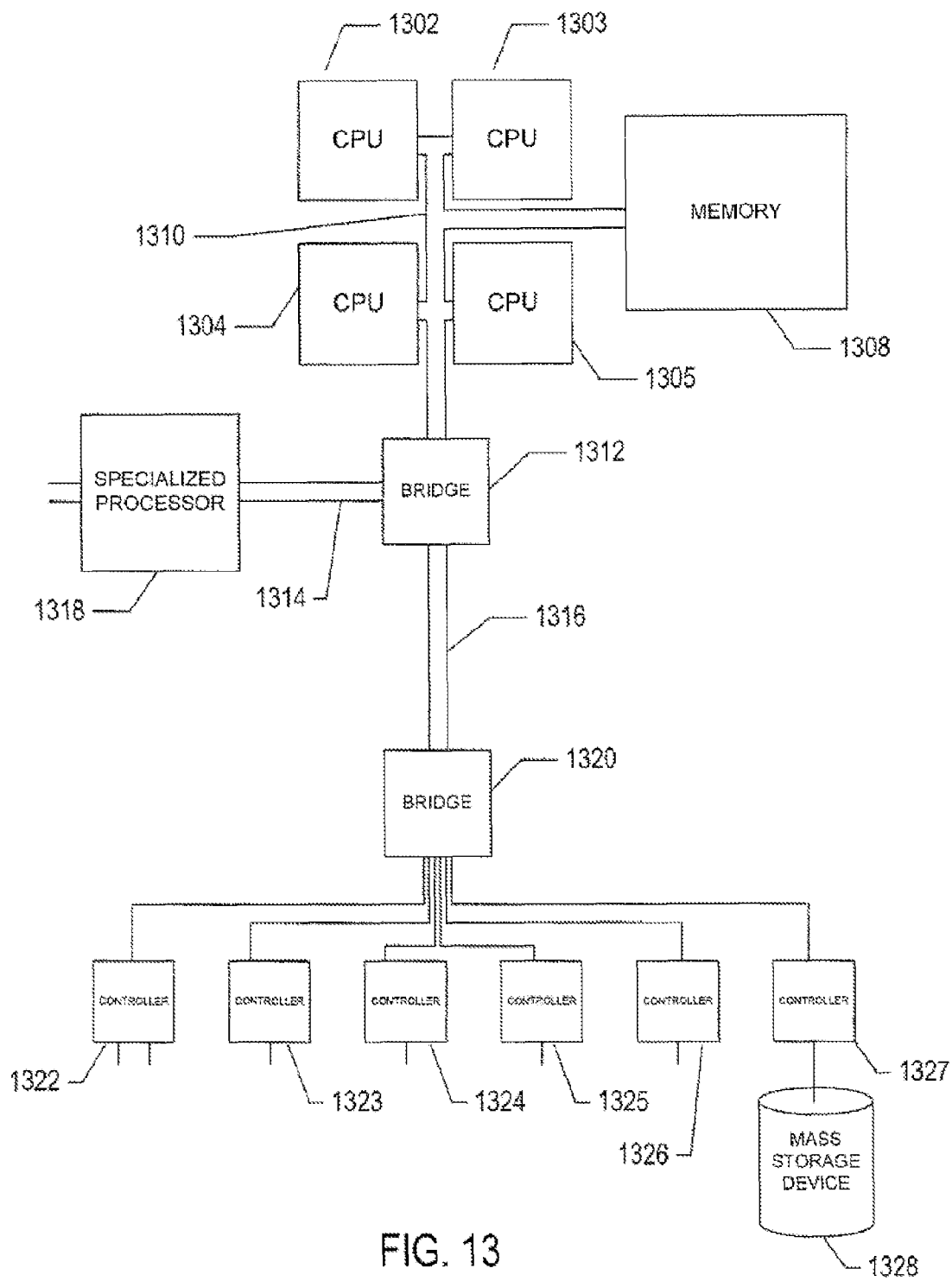
FIG. 13 provides a general architectural diagram for various types of computers.

FIG. 13 provides a general architectural diagram for various types of computers. The computer system contains one or multiple central processing units ("CPUs") 1302-1305, one or more electronic memories 1308 interconnected with the CPUs by a CPU/memory-subsystem bus 1310 or multiple busses, a first bridge 1312 that interconnects the CPU/memory-subsystem bus 1310 with additional busses 1314 and 1316, or other types of high-speed interconnection media, including multiple, high-speed serial interconnects. These busses or serial interconnections, in turn, connect the CPUs and memory with specialized processors, such as a graphics processor 1318, and with one or more additional bridges 1320, which are interconnected with high-speed serial links or with multiple controllers 1322-1327, such as controller 1327, that provide access to various different types of mass-storage devices 1328, electronic displays, input devices, and other such components, subcomponents, and computational resources.

Figure 14:
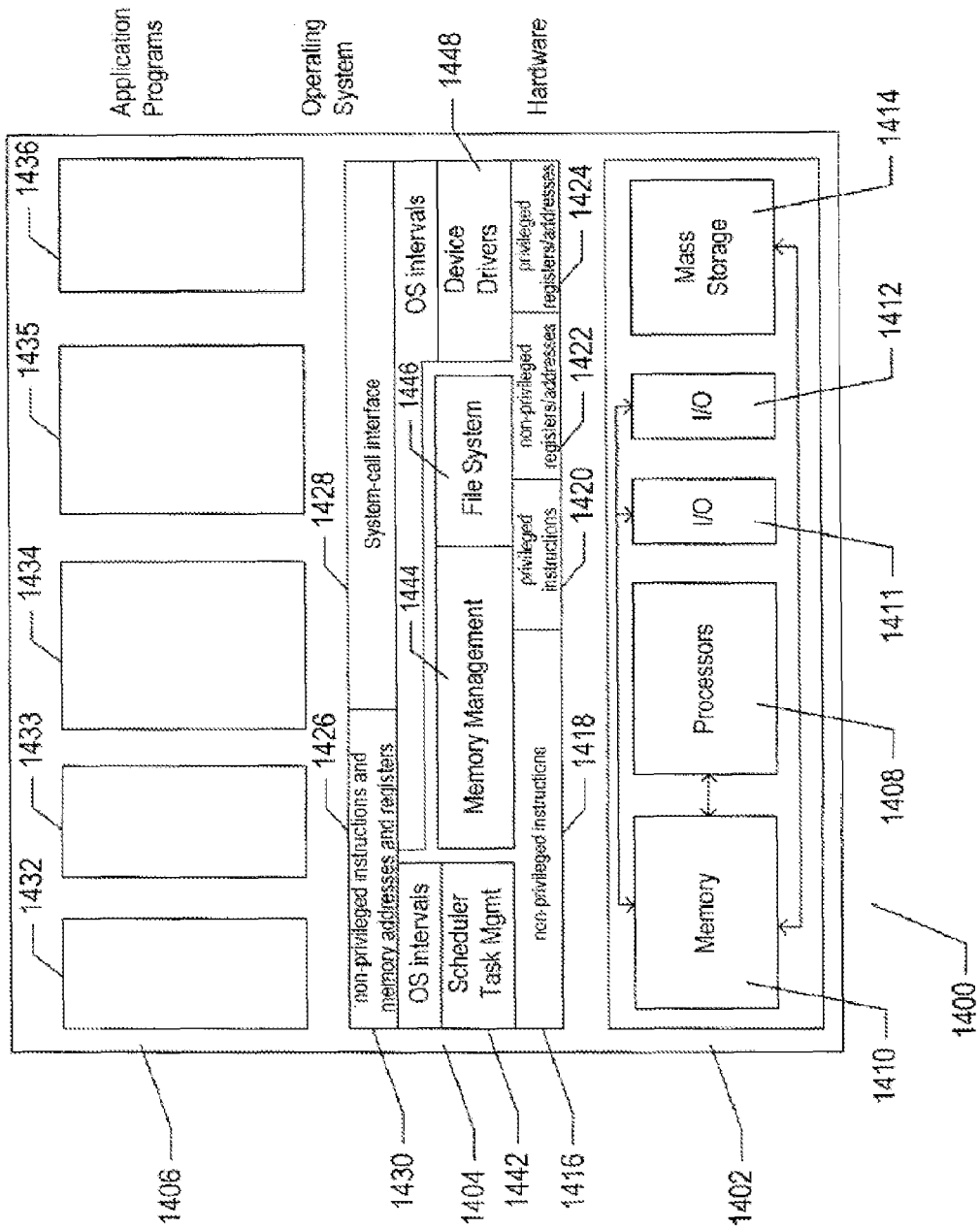
FIG. 14 illustrates generalized hardware and software components of a general-purpose computer system, such as a general-purpose computer system having an architecture similar to that shown in FIG. 13.

FIG. 14 illustrates generalized hardware and software components of a general-purpose computer system, such as a general-purpose computer system having an architecture similar to that shown in FIG. 13. The computer system 1400 is often considered to include three fundamental layers: (1) a hardware layer or level 1402; (2) an operating-system layer or level 1404; and (3) an application-program layer or level 1406. The hardware layer 1402 includes one or more processors 1408, system memory 1410, various different types of input-output ("I/O") devices 1410 and 1412, and mass-storage devices 1414. Of course, the hardware level also includes many other components, including power supplies, internal communications links and busses, specialized integrated circuits, many different types of processor-controlled or microprocessor-controlled peripheral devices and controllers, and many other components. The operating system 1404 interfaces to the hardware level 1402 through a low-level operating system and hardware interface 1416 generally comprising a set of non-privileged processor instructions 1418, a set of privileged processor instructions 1420, a set of non-privileged registers and memory addresses 1422, and a set of privileged registers and memory addresses 1424. In general, the operating system exposes non-privileged instructions, non-privileged registers, and non-privileged memory addresses 1426 and a system-call interface 1428 as an operating-system interface 1430 to application programs 1432-1436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 1442, memory management 1444, a file system 1446, device drivers 1448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 1036 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 15:
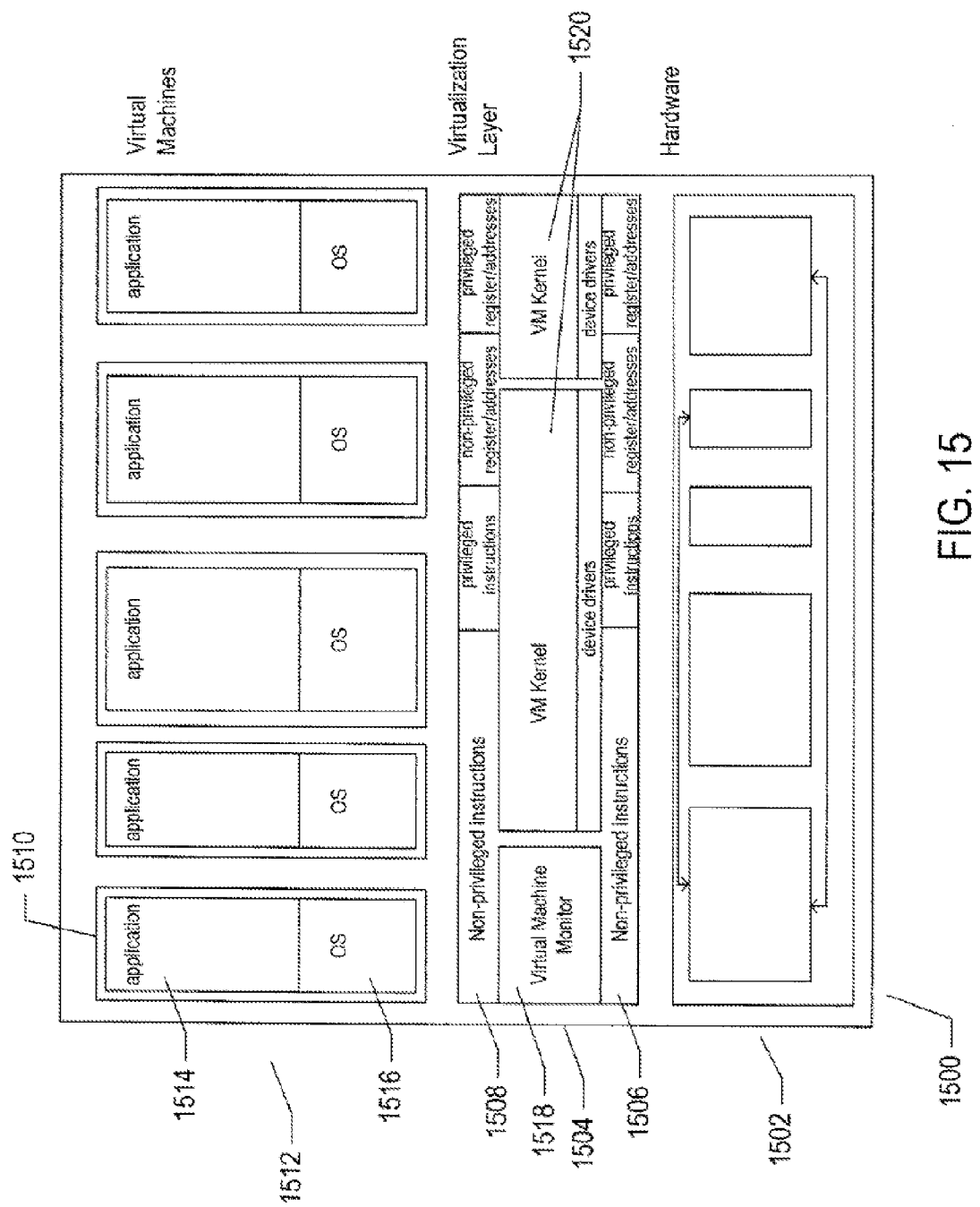
FIG. 15 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 15 illustrates one type of virtual machine and virtual-machine execution environment. FIG. 15 uses the same illustration conventions as used in FIG. 10. In particular, the computer system 1500 in FIG. 15 includes the same hardware layer 1502 as the hardware layer 1502 shown in FIG. 14. However, rather than providing an operating system layer directly above the hardware layer, as in FIG. 14, the virtualized computing environment illustrated in FIG. 15 features a virtualization layer 1504 that interfaces through a virtualization-layer/hardware-layer interface 1506, equivalent to interface 1416 in FIG. 14, to the hardware. The virtualization layer provides a hardware-like interface 1508 to a number of virtual machines, such as virtual machine 1510, executing above the virtualization layer in a virtual-machine layer 1512. Each virtual machine includes one or more application programs or other higher-level computational entities packaged together with an operating system, such as application 1514 and operating system 1516 packaged together within virtual machine 1510. Each virtual machine is thus equivalent to the operating-system layer 1404 and application-program layer 1406 in the general-purpose computer system shown in FIG. 14. Each operating system within a virtual machine interfaces to the virtualization-layer interface 1508 rather than to the actual hardware interface 1506. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 1508 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor module 1518 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 1508, the accesses result in execution of virtualization-layer code to simulate or emulate the privileged resources. The virtualization layer additionally includes a kernel module 1520 that manages memory, communications, and data-storage machine resources on behalf of executing virtual machines. The kernel, for example, maintains shadow page tables on each virtual machine so that hardware-level virtual-memory facilities can be used to process memory accesses. The kernel additionally includes routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Although the present invention has been described in terms of particular embodiments, it is not intended that the invention be limited to these embodiments. Modifications within the spirit of the invention will be apparent to those skilled in the art. For example, byte-code implementation filtering may be implemented in many different ways by varying any of many different design and implementation parameters, including programming language, underlying operating system, choice of virtual-machine technology, modular organization, data structures, control structures, language syntax, and other such parameters. Byte-code-instrumentation filtering may be employed to filter potentially generated data prior to logging that data in a variety of different contexts using a variety of different types of logical filters. In the above example, a single trace associated with an elapsed-time metric within a particular elapsed-time interval is logged during each time interval associated with the particular elapsed-time interval. In alternative implementations, up to some maximum number of entries may be logged within each time interval. In yet another implementation, the logging of data produced by byte-code instrumentation may be contingent on a type of error detected and associated with an execution trace or based on other such data values. Filtering may consider any metric or value generated or collected by byte-code instrumentation. The elapsed-time metric is only one example of the many types of metrics that may be used for byte-code-instrumentation filtering. Filtered information may be logged in a variety of different formats and may include a variety of different types of data. Filtering of data produced by byte-code instrumentation, according to the current application, occurs within the byte-code instrumentation prior to logging or reporting of the data.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for filtering data generated by computer program instrumentation, the method performed by one or more processors, the method comprising:
   generating a bins array having elements that each represent one time interval of a sequence of time intervals of a time-based filter;
   generating an indexes array having elements whose values are indexes into the bins array and whose indexes each represent respective multiples of a particular elapsed time increment value;
   at an instrumentation point in a computer program, generating a potential data frame, the potential data frame having an elapsed time value;
   computing a first index value into the indexes array, the first index value corresponding to the elapsed time of the potential data frame divided by the elapsed time increment value;
   obtaining an initial bin element of the bins array, the initial bin element being identified by a value of a first index element of the indexes array identified by the computed first index value into the indexes array;
   scanning the bins array starting from the initial bin element to identify a bin element uniquely representing a time interval that includes the elapsed time value of the potential data frame;
   determining that the bin element is already associated with at least a threshold number of potential data frames generated within a time window ending at a present time; and
   rejecting the potential data frame in response to determining that the bin element is already associated with at least the threshold number of data frames generated within the time window.

2. The method of claim 1, wherein the bins array has at least one first bin element that corresponds to a substantially different interval of time than a second bin element of the bins array.

3. The method of claim 1, wherein each bin element of the bins array has an associated maximum elapsed time value representing an end of a time interval represented by the bin element.

4. The method of claim 3, wherein scanning the bins array starting from the initial bin element comprises:
   scanning sequentially through the bins array starting from the initial bin element until reaching a second bin element of the bins array having an associated maximum time value that is greater than or equal to the elapsed time value of the potential data frame; and
   identifying the bin element of the bins array as a bin element immediately preceding the second bin element of the bins array.

5. The method of claim 3, wherein generating the indexes array comprises:
   scanning sequentially through the indexes array for each multiple of the time increment value and assigning to each index element of the indexes array a value corresponding to an index of a bin element in the bins array having a maximum elapsed time value that is less than the multiple of the time increment value.

6. The method of claim 1, wherein each bin element of the bins array has a respective time window representing a time window during which all but the threshold number of potential data frames will be rejected.

7. The method of claim 6, wherein the bins array has a first bin element and a second bin element having different respective time windows.

8. The method of claim 1, further comprising:
at a second instrumentation point in the computer program, generating a second potential data frame, the second potential data frame having a second elapsed time value;
computing a second index value into the indexes array, the second index value corresponding to the elapsed time of the potential data frame divided by the elapsed time increment value;
obtaining a second initial bin element of the bins array, the second initial bin element being identified by a second value of a second index element of the indexes array identified by the computer second index value into the indexes array;
scanning the bins array starting from the second initial bin element to identify a second bin element uniquely representing a second time interval that includes the second elapsed time value of the second potential data frame;
determining that the second bin element is not already associated with at least the threshold number of data frames generated with the time window ending at a present time; and
logging the potential data frame in response to determining that the second bin element is not already associated with at least the threshold number of data frames generated with the time window.

9. A system comprising:
one or more computers and one or more storage devices storing instructions that are operable, when executed by the one or more computers, to cause the one or more computers to perform operations comprising:
generating a bins array having elements that each represent one time interval of a sequence of time intervals of a time-based filter;
generating an indexes array having elements whose values are indexes into the bins array and whose indexes each represent respective multiples of a particular elapsed time increment value;
at an instrumentation point in a computer program, generating a potential data frame, the potential data frame having an elapsed time value;
computing a first index value into the indexes array, the first index value corresponding to the elapsed time of the potential data frame divided by the elapsed time increment value;
obtaining an initial bin element of the bins array, the initial bin element being identified by a value of a first index element of the indexes array identified by the computed first index value into the indexes array;
scanning the bins array starting from the initial bin element to identify a bin element uniquely representing a time interval that includes the elapsed time value of the potential data frame;
determining that the bin element is already associated with at least a threshold number of potential data frames generated within a time window ending at a present time; and
rejecting the potential data frame in response to determining that the bin element is already associated with at least the threshold number of data frames generated within the time window.

10. The system of claim 9, wherein the bins array has at least one first bin element that corresponds to a substantially different interval of time than a second bin element of the bins array.

11. The system of claim 9, wherein each bin element of the bins array has an associated maximum elapsed time value representing an end of a time interval represented by the bin element.

12. The system of claim 11, wherein scanning the bins array starting from the initial bin element comprises:
scanning sequentially through the bins array starting from the initial bin element until reaching a second bin element of the bins array having an associated maximum time value that is greater than or equal to the elapsed time value of the potential data frame; and
identifying the bin element of the bins array as a bin element immediately preceding the second bin element of the bins array.

13. The system of claim 11, wherein generating the indexes array comprises:
scanning sequentially through the indexes array for each multiple of the time increment value and assigning to each index element of the indexes array a value corresponding to an index of a bin element in the bins array having a maximum elapsed time value that is less than the multiple of the time increment value.

14. The system of claim 9, wherein each bin element of the bins array has a respective time window representing a time window during which all but the threshold number of potential data frames will be rejected.

15. The system of claim 14, wherein the bins array has a first bin element and a second bin element having different respective time windows.

16. The system of claim 9, wherein the operations further comprise:
at a second instrumentation point in the computer program, generating a second potential data frame, the second potential data frame having a second elapsed time value;
computing a second index value into the indexes array, the second index value corresponding to the elapsed time of the potential data frame divided by the elapsed time increment value;
obtaining a second initial bin element of the bins array, the second initial bin element being identified by a second value of a second index element of the indexes array identified by the computer second index value into the indexes array;
scanning the bins array starting from the second initial bin element to identify a second bin element uniquely representing a second time interval that includes the second elapsed time value of the second potential data frame;
determining that the second bin element is not already associated with at least the threshold number of data frames generated with the time window ending at a present time; and
logging the potential data frame in response to determining that the second bin element is not already associated with at least the threshold number of data frames generated with the time window.

17. A computer program product including one or more non-transitory computer storage media, comprising instructions that when executed by one or more computers cause the one or more computers to perform operations comprising:
generating a bins array having elements that each represent one time interval of a sequence of time intervals of a time-based filter;
generating an indexes array having elements whose values are indexes into the bins array and whose indexes each represent respective multiples of a particular elapsed time increment value;

at an instrumentation point in a computer program, generating a potential data frame, the potential data frame having an elapsed time value;

computing a first index value into the indexes array, the first index value corresponding to the elapsed time of the potential data frame divided by the elapsed time increment value;

obtaining an initial bin element of the bins array, the initial bin element being identified by a value of a first index element of the indexes array identified by the computed first index value into the indexes array;

scanning the bins array starting from the initial bin element to identify a bin element uniquely representing a time interval that includes the elapsed time value of the potential data frame;

determining that the bin element is already associated with at least a threshold number of potential data frames generated within a time window ending at a present time; and rejecting the potential data frame in response to determining that the bin element is already associated with at least the threshold number of data frames generated within the time window.

18. The computer program product of claim 17, wherein the bins array has at least one first bin element that corresponds to a substantially different interval of time than a second bin element of the bins array.

19. The computer program product of claim 17, wherein each bin element of the bins array has an associated maximum elapsed time value representing an end of a time interval represented by the bin element.

20. The computer program product of claim 19, wherein scanning the bins array starting from the initial bin element comprises:

scanning sequentially through the bins array starting from the initial bin element until reaching a second bin element of the bins array having an associated maximum time value that is greater than or equal to the elapsed time value of the potential data frame; and identifying the bin element of the bins array as a bin element immediately preceding the second bin element of the bins array.

* * * * *